US012704763B2

(12) United States Patent
Cheng

(10) Patent No.: US 12,704,763 B2
(45) Date of Patent: Aug. 11, 2026

(54) PHOTONIC CIRCUITRY HAVING MULTIPLE OPTICAL RESONATORS

(71) Applicant: Taiwan Semiconductor Manufacturing Company, Ltd., Hsin-Chu (TW)

(72) Inventor: Wen-Hao Cheng, Hsinchu (TW)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 0 days.

(21) Appl. No.: 18/305,785

(22) Filed: Apr. 24, 2023

(65) Prior Publication Data

US 2024/0019758 A1 Jan. 18, 2024

Related U.S. Application Data

(60) Provisional application No. 63/389,254, filed on Jul. 14, 2022.

(51) Int. Cl.
*G02F 1/365* (2006.01)
*G02F 1/35* (2006.01)

(52) U.S. Cl.
CPC ............ *G02F 1/365* (2013.01); *G02F 1/3507* (2021.01); *G02F 1/3536* (2013.01)

(58) Field of Classification Search
CPC . G02F 1/3526; G02F 1/3536; G02B 6/29335; G02B 6/29338–29343
See application file for complete search history.

(56) References Cited

U.S. PATENT DOCUMENTS 6,411,752 B1 * 6/2002 Little .................... G02B 6/126 385/24
6,947,632 B2 * 9/2005 Fischer .................. G02F 1/035 385/32
7,145,660 B2 * 12/2006 Margalit ............... G01N 21/45 356/477
7,729,576 B2 * 6/2010 Kornilovich ....... G02B 6/12007 385/32
8,588,556 B1 * 11/2013 Dong .................. H04B 10/541 385/32
9,829,635 B2 * 11/2017 Tu ...................... G02B 6/29341
10,261,391 B2 * 4/2019 Casale .................... G02F 1/395
10,372,014 B1 8/2019 Vidrighin et al.
10,649,307 B2 5/2020 Vernon et al.
2006/0078254 A1 * 4/2006 Djordjev ............ G02B 6/12007 385/32
2007/0223859 A1 * 9/2007 Kornilovich ............. G09F 9/00 385/27

(Continued)

FOREIGN PATENT DOCUMENTS

CN 102564960 A 7/2012
JP 2020008734 A 1/2020
TW 202105864 A 2/2021

*Primary Examiner* — Rhonda S Peace
(74) *Attorney, Agent, or Firm* — HAYNES AND BOONE, LLP

(57) ABSTRACT

An optical device includes a first ring resonator with a first radius, a second ring resonator with a second radius, and an optical waveguide feeding the first and second ring resonators in parallel. The first and second ring resonators are positioned on opposing sides of the optical waveguide. The first and second ring resonators and the optical waveguide are disposed above a semiconductor substrate.

20 Claims, 14 Drawing Sheets

(56) References Cited

U.S. PATENT DOCUMENTS

| | | | | |
|---|---|---|---|---|
| 2012/0012739 | A1* | 1/2012 | Koch | G02B 6/29341 250/227.11 |
| 2016/0209593 | A1* | 7/2016 | Jiang | G02B 6/2773 |
| 2018/0020272 | A1 | 1/2018 | Testa et al. | |
| 2018/0261288 | A1* | 9/2018 | Frumkin | G02B 6/12004 |
| 2019/0285797 | A1 | 9/2019 | Campanella | |
| 2020/0348579 | A1 | 11/2020 | Heuck et al. | |
| 2021/0194586 | A1 | 6/2021 | Middlebrook et al. | |
| 2022/0076155 | A1 | 3/2022 | MacFarlane et al. | |
| 2022/0196913 | A1* | 6/2022 | Winters | G02B 6/266 |
| 2023/0393339 | A1* | 12/2023 | Pawlak | G02B 6/4215 |
| 2024/0004264 | A1* | 1/2024 | Cheng | G02F 1/3536 |
| 2024/0019758 | A1* | 1/2024 | Cheng | G02F 1/3536 |

* cited by examiner

PHOTONIC CIRCUITRY HAVING MULTIPLE OPTICAL RESONATORS

PRIORITY

This application claims the benefits of U.S. Prov. App. Ser. No. 63/389,254, filed Jul. 14, 2022, the entire disclosure of which is incorporated herein by reference.

BACKGROUND

Optical resonators have found wide applications in classical optical communication systems. For example, optical resonators are very promising for providing high data rate, ultra-low power consumption, and small footprint (or size) for wavelength division multiplexing (WDM) technology including dense WDM (DWDM) technology in optical communication systems. Recently, optical resonators also found applications in photonic quantum technologies, such as quantum computation. For example, optical resonators may be implemented as source for providing squeezed light. Squeezed light refers to light in which the electric field strength for some phases has a quantum uncertainty (also referred to as noise) smaller than that of a coherent state. A wide range of applications can benefit from high quality sources of squeezed light. To fully exploit the potential of squeezed light in photonic quantum technologies, it is desired for the squeezed light source to be scalable, tunable, compatible with existing optical technology. Accordingly, there is a need to further improve optical resonator structures that provide high spectral purity and high optical power efficiency. Classical optical communication systems may also benefit from such improvement in optical resonator structures.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only except explicitly disclosed. In fact, the dimensions of the various features may be arbitrarily increased or reduced for clarity of discussion.

DETAILED DESCRIPTION

Figure 1A:
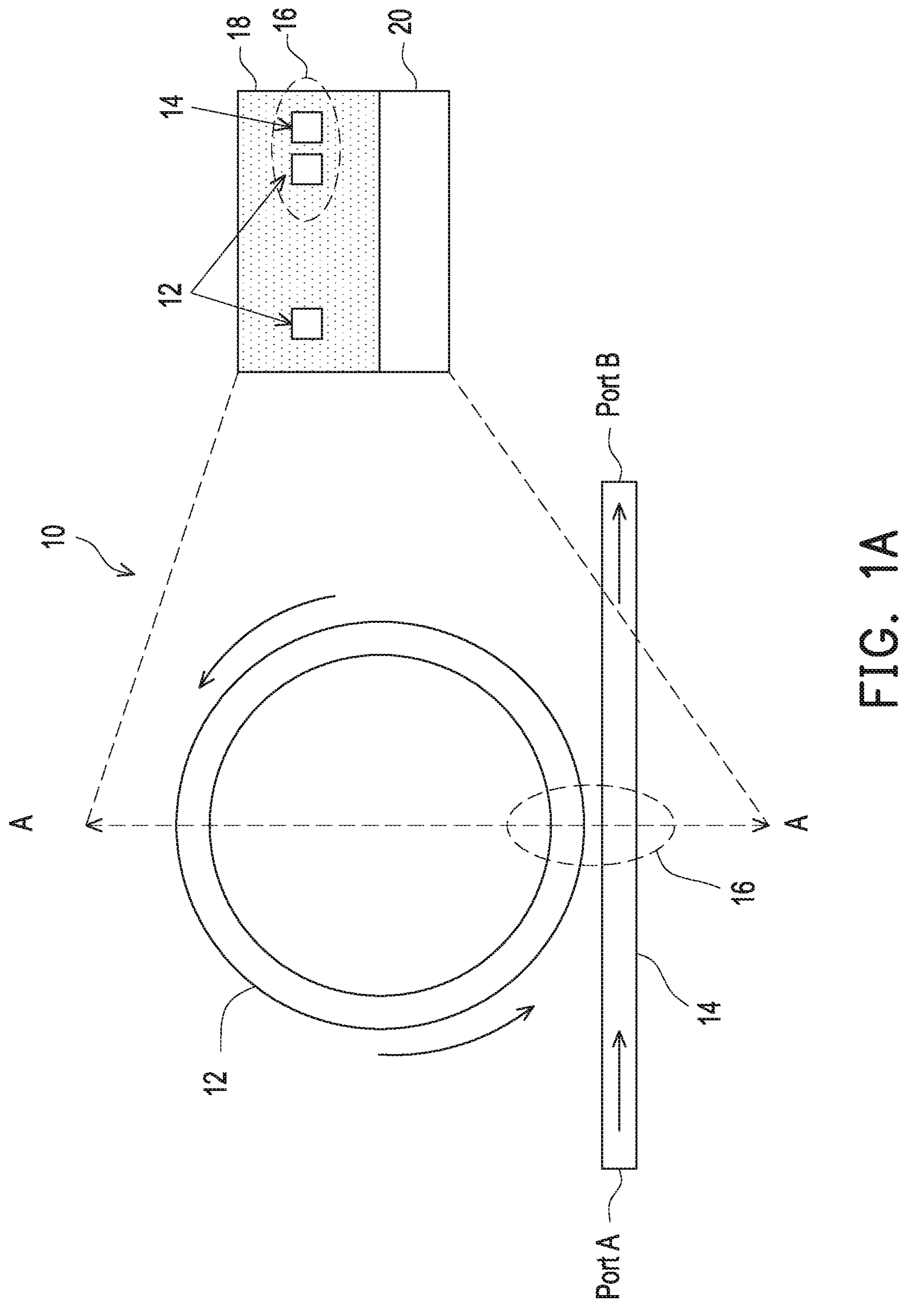
FIG. 1A illustrates a diagram of a photonic circuit with a ring resonator and a single rail optical waveguide, according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, when a number or a range of numbers is described with "about," "approximate," and the like, the term is intended to encompass numbers that are within a reasonable range considering variations that inherently arise during manufacturing as understood by one of ordinary skill in the art. For example, the number or range of numbers encompasses a reasonable range including the number described, such as within +/−10% of the number described, based on known manufacturing tolerances associated with manufacturing a feature having a characteristic associated with the number. For example, a material layer having a thickness of "about 5 nm" can encompass a dimension range from 4.5 nm to 5.5 nm where manufacturing tolerances associated with depositing the material layer are known to be +/−10% by one of ordinary skill in the art.

The present disclosure relates to photonic circuitry (or photonic structure), particularly photonic circuitry having multiple optical resonators. In some exemplary embodiments, the photonic circuitry having multiple optical resonators are implemented in generating squeezed light (also referred to as light in a squeezed state) for photonic quantum mechanics, such as quantum computation. The exemplary embodiments of the photonic circuitry provide photon sources with high spectral purity and high optical power efficiency. Meanwhile, the present disclosure is not limited thereto. Various optical communication systems or network technologies based on classical processing units also use both optical components and electronic circuits, and may implement the exemplary embodiments of the photonic circuitry for performance improvement. For example, the exemplary photonic circuitry having multiple optical resonators may be implemented in various optical communication systems, such as in wavelength division multiplexing (WDM) applications.

Quantum mechanics can have many advantages in encoding, transmission, and processing of information. For example, quantum key distribution may be used to achieve high secure communication. Quantum metrology can be used to achieve precision measurements that could not be achieved without using quantum mechanics. In particular, a quantum computer based on quantum mechanical effects can offer exponentially faster computation or higher computation throughput. Certain computational problems, such as the factoring of large numbers, cannot easily be solved using conventional computers due to the time required to complete the computation. It has, however, been shown that quantum computers can use non-classical algorithmic methods to provide efficient solutions to certain of these types of computational problems, among others.

The fundamental unit of quantum information in a quantum computer is called a quantum bit, or qubit. Quantum computers may utilize physical particles to represent or implement a quantum bit. In an electron approach, a “0” or a “1” may be represented by the spin of an electron, where the up or down spin can correspond to “0”, “1”, or a superposition of states in which the electron’s spin is both up and down at the same time. Similarly, in a photonic approach to quantum computing, a “0” may be represented by the possibility of observing a single photon in a given path (or waveguide), whereas the potential for observing the same photon in a different path may represent a “1”. Photons are excellent quantum information carriers because they combine high speed with long coherence times at room temperature. Accordingly, one realization in some quantum informatic processing systems is to utilize the quantum observables of a photon to encode information in qubits.

In such photonic-based quantum computing systems, one means for determining an interval in time in which the photon can be located in a particular spatial interval is the implementation of a “heralded” system. A heralded system consists of two photons with a known temporal coincidence window wherein the first photon is referred to as the “signal” photon and the second photon is referred to as the “idler” photon. To ensure that the (signal, idler) photon pair is coincident within a particular pre-determined and temporal coincidence window, particular known physical processes are employed, depending on the system. However, such heralded systems are often quite inefficient. Most architectures for photonic-based heralded quantum computing systems can only make use of a photon pair produced from a source a fraction of the time such a pair is actually produced. As such, the coupling efficiency or optical power efficiency of such quantum circuitry is severely compromised. Most architectures for photonic-based heralded quantum computing systems also suffer from limit quality factors in which spurious light are induced. As such, the spectral purity of such quantum circuitry is often compromised as well. What is desired then, is to increase the optical power efficiency and quality factor of a heralded system in photonic-based quantum circuitry.

To generate (signal, idler) photon pairs, photonic structures having an optical resonator, such as a ring resonator (or referred to as circular resonator), may be employed. A generic ring resonator consists of an optical waveguide that is looped back on itself, such that a resonance occurs when the optical path length of the resonator is exactly a whole number of wavelengths. Ring resonators therefore support multiple resonances, and the spacing between these resonances, the free spectral range (FSR), depends on the resonator length. By utilizing particular types or configurations of ring resonators in combination with certain photon sources, or couplings of photon sources to the ring resonators, (signal, idler) photon pairs with a differentiating attribute (e.g., wavelength) may be produced. Photonic-based quantum circuitry can then make use of such photon pairs in performing quantum computing.

A first particular physical process that enables heralded systems employs the use of the principle of “spontaneous parametric down conversion” (SPDC). The SPDC process may employ a nonlinear optical material, often a crystal, to effect time coincident generation of a signal photon and corresponding idler photon as products of a nonlinear optical process. SPDC occurs due to the non-zero second-order electric susceptibility term of the dielectric polarization for a non-linear material. SPDC utilizes a single incident photon under phase matching conditions, referred to here as the “pump” photon that is characterized by a frequency, $\omega_{pump}$. The pump photon with frequency, $\omega_{pump}$, is incident to a nonlinear optical material that can spontaneously convert the single pump photon energy into a (signal, idler) pair of temporal coincident photons with each having a frequency of $\omega_{signal}$ and $\omega_{idler}$ respectively wherein $\omega_{pump}=\omega_{signal}+\omega_{idler}$. Because the second-order non-linear effects are nearly instantaneous, the detection of one of the said created pair can herald the generation of the other.

A second particular physical process that enables heralded systems employs the use of the principle of “spontaneous four-wave mixing” (SFWM). The SFWM process may employ a structure that serves as a resonant cavity with a corresponding “quality factor” denoted by Q. SFWM occurs due to the non-zero third-order electric susceptibility term of the dielectric polarization of the cavity material. It is noted that cavities made of isotropic materials (one example is silica glass) have zero-valued second-order terms, thus the non-linear response of such materials is dominated by the non-zero third-order terms. One such resonant cavity structure is the “ring resonator.” Within an appropriate structure or medium, SFWM can be regarded as the virtual absorption to two pump photons of frequency $\omega_{1pump}$ and $\omega_{2pump}$ with appropriate phase matching conditions resulting in the spontaneous creation of a (signal, idler) pair. Because the third-order non-linear effects are nearly instantaneous, the detection of one of the said created pair can herald the generation of the other. Due to the mixing relationship, the frequencies of the two pump photons and those of the resulting (signal, idler) pair are related as $\omega_{1pump}+\omega_{2pump}=\omega_{signal}+\omega_{idler}$.

In herald systems it is desirable that the signal and the idler photons have a property that is different between them that allows one to be distinguished from the other, and, further, to route one of the photons differently than the other. One example of such a property is to enable slight deviations in the phase matching criterion resulting in slight predictable deviations in wavelength of the spontaneously generated (signal, idler) pairs as compared to the wavelengths of the two pump photons. The predictable wavelength deviations of a (signal, idler) pair enables the use of SFWM to generate a signal photon at a first wavelength that is time coincident with a idler photon at a second wavelength, wherein the first wavelength of the signal photon differs from the second wavelength of the idler photon.

Figure 1B:
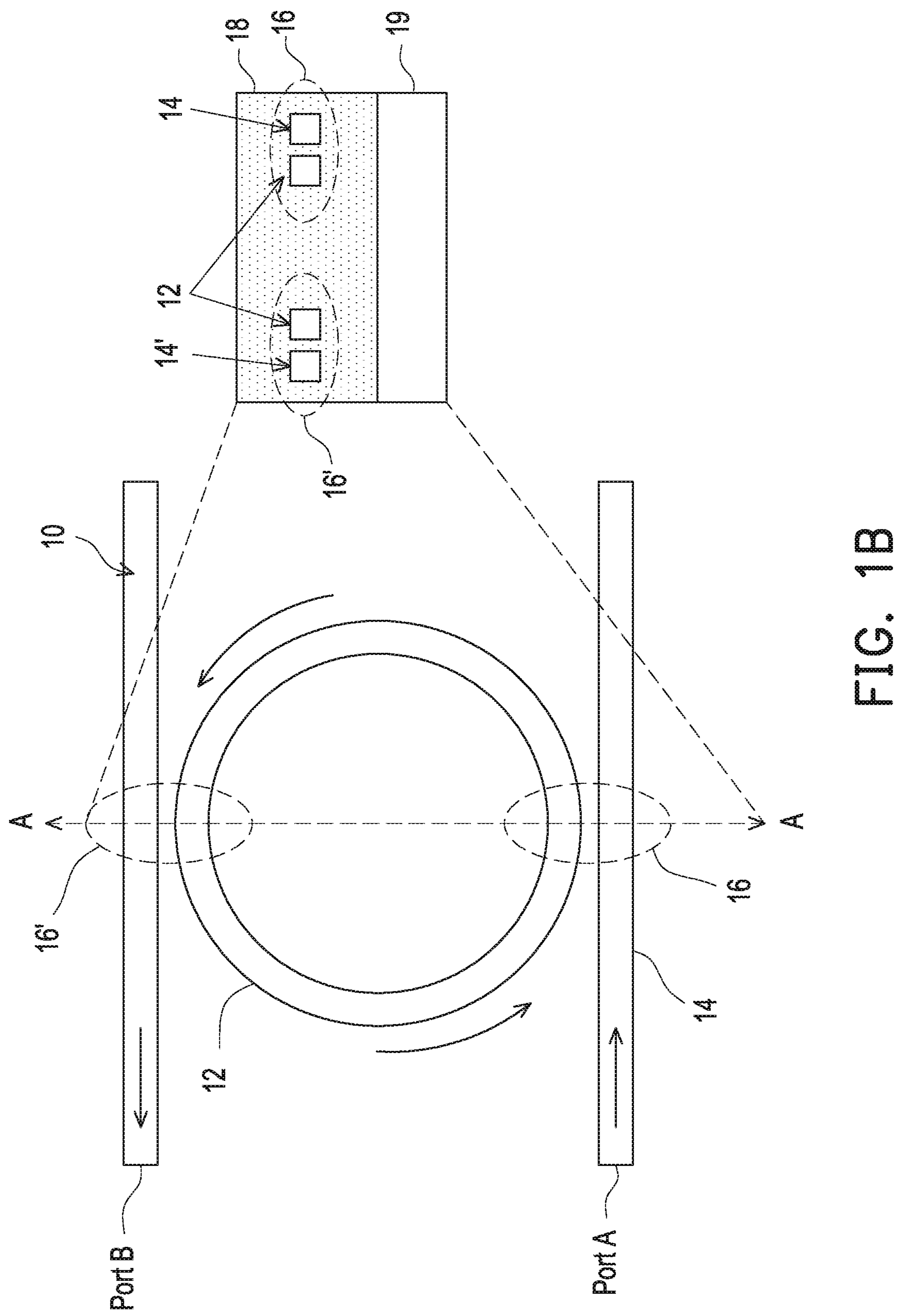
FIG. 1B illustrates a diagram of a photonic circuit with a ring resonator and dual rail optical waveguides, according to an embodiment of the present disclosure.

Referring to FIGS. 1A and 1B, some exemplary photonic circuits having a ring resonator that may be utilized as a photon pair source are illustrated. FIG. 1A illustrates a top view of a photonic circuit 10 that includes a ring resonator 12 and an optical waveguide (or referred to as bus optical waveguide) 14 in the form of a single rail. The ring resonator 12 can be considered as a type of optical waveguide in the form of a ring. A cross-sectional view of the photonic circuit 10 along a line A-A traveling through a center of the ring resonator 12 is also illustrated. The ring resonator 12 and the optical waveguide 14 each may include a non-linear optical material (such as silicon nitride or other suitable material including $LiNbO_3$, AlGaAs, InP, or AlN) surrounded by an oxide layer 18 (such as silicon dioxide) that is disposed over a semiconductor substrate 19 (such as a silicon substrate). Further, the ring resonator and the optical waveguides may have different material compositions.

The ring resonator 12 may include a waveguide loop such that a resonance for photons having a certain wavelength may occur when the optical path length of the ring resonator is an integer number of the wavelength of the photons. The ring resonator 12 may support multiple resonances at multiple wavelengths that may meet the resonance condition. The spacing between these resonances in spectra may be referred to as the free spectral range (FSR) and may depend on the optical path length of the ring resonator. The ring resonator 12 may have a radius less than about a millimeter (mm)—such as about 5-50 micrometers (um)—and is also referred to as a micro-ring resonator. The terms “ring resonator” and “micro-ring resonator” are used interchangeable in the present disclosure.

Photon source(s) provides photons to the optical waveguide 14 though an input port, denoted as Port A. The photons propagate in the direction towards an output port of the optical waveguide 14, denoted as Port B. Photons traveling through one optical waveguide may be coupled into an adjacent optical waveguide. This phenomenon is referred to as evanescent coupling. As photons propagates through the optical waveguide 14, a fraction will be coupled into the ring resonator 12. To increase the fraction of photons coupled into the ring resonator 12 and accordingly to increase the coupling efficiency, the ring resonator 12 is closely positioned to the optical waveguide 14 to enhance the evanescent coupling. Thus, such evanescent coupling is also referred to as near-field coupling.

A region is indicated as near-field coupling region 16 that is representative of the portion of the photonic circuit 10 where near-field coupling occurs between the ring resonator 12 and the optical waveguide 14. A fraction of the photons coupled from the optical waveguide 14 propagate into the ring resonator 12, and a remaining fraction of the photons continue to propagate in the optical waveguide 14 and exit the optical waveguide 14 from Port B. Of the fraction of the photons that are coupled into the ring resonator 12, some further fraction undergoes a spontaneous physical process. For example, spontaneous four wave mixing (SFWM) or spontaneous parametric down-conversion (SPDC) process may occur in the ring resonator 12. In an SFWM process, two pump photons may be converted into a pair of daughter photons (e.g., signal and idler photons) in the nonlinear optical material. Due to energy conservation, the signal and idler photons generated may be at frequencies that are symmetrically distributed around the pump frequency. In general, due to such a spectral correlation, the heralded photons may be in a mixed state. The signal and idler photon generated within the ring resonator 12 may be coupled out of the ring resonator 12 and back to the optical waveguide 14 and exit towards the Port B, which occur in the near-field coupling region 16 at a certain coupling efficiency. The propagation directions of the photons in the optical waveguide 14 and the ring resonator 12 may be as shown in arrows in FIG. 1A.

FIG. 1B illustrates another embodiment of the photonic circuit 10, which further includes a second optical waveguide 14' in the form of a single rail. A cross-sectional view of the photonic circuit 10 along a line A-A traveling through a center of the ring resonator 12 is also illustrated. The ring resonator 12 and the optical waveguides 14 and 14' each may include a non-linear optical material (such as silicon nitride or other suitable material including $LiNbO_3$, AlGaAs, InP, or AlN) surrounded by an oxide layer 18 (such as silicon dioxide) that is disposed over a semiconductor substrate 19 (such as a silicon substrate). Further, the ring resonator and the optical waveguides may have different material compositions. The signal and idler photons generated within the ring resonator 12 may be coupled out of the ring resonator 12 to the second optical waveguide 14' and exit towards the port B, which occur in a second near-field coupling region 16 at a certain coupling efficiency. The propagation directions of the photons in the first optical waveguide 14, the ring resonator 12, and the second optical waveguide 14' may be as shown in arrows in FIG. 1B.

Figure 2:
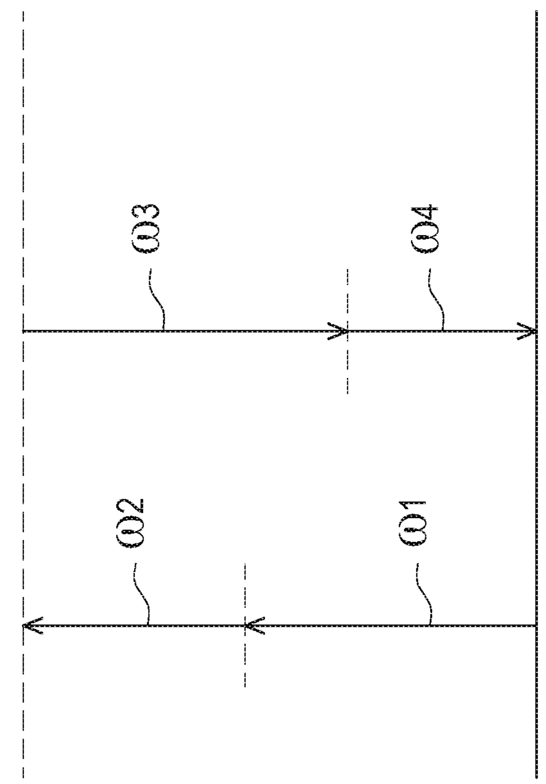
FIG. 2 shows a virtual level diagram of a spontaneous four-wave mixing process in a photon-pair source, according to an embodiment of the present disclosure.

FIG. 2 is a virtual level diagram illustrating an example of a spontaneous four wave mixing (SFWM) process occurred in a photon-pair source. A pump photon at a first frequency $\omega 1$ and a pump photon at a second frequency $\omega 2$ may be mixed to generate a pair of photons with frequencies of $\omega 3$ and $\omega 4$, respectively. The two pump photons may have a same frequency or wavelength (i.e., $\omega 1=\omega 2$), such as provided by a single photon source. The two pump photons may have different frequencies or wavelengths (i.e., $\omega 1\neq\omega 2$), such as provided by two combined photon sources. Due to energy conservation, frequencies of $\omega 3$ and $\omega 4$ of generated pair of photons may be symmetrical with respect to the frequency $\omega$ of the pump photons in the spectrum (i.e., $|\omega 3-\omega 1|=|\omega 1-\omega 4|$). It is noted with respect to FIGS. 1A and 1B that what coupled to the Port A may be the output of a single source (i.e., $\omega 1=\omega 2$) or two (or more) combined sources (i.e., $\omega 1\neq\omega 2$).

Figure 3A:
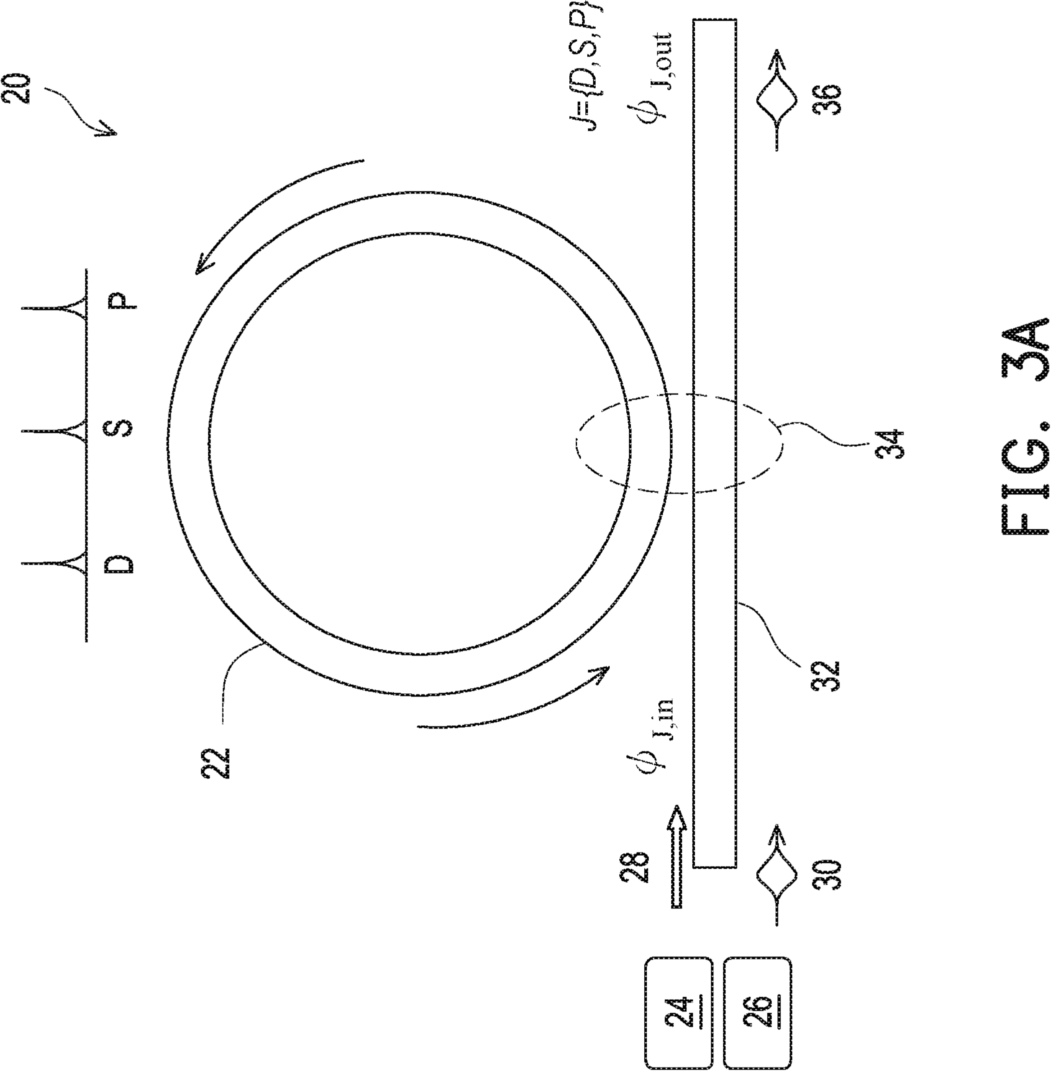
FIG. 3A illustrates a diagram of a photonic circuit with a ring resonator for generating squeezed light, according to an embodiment of the present disclosure.
Figure 3B:
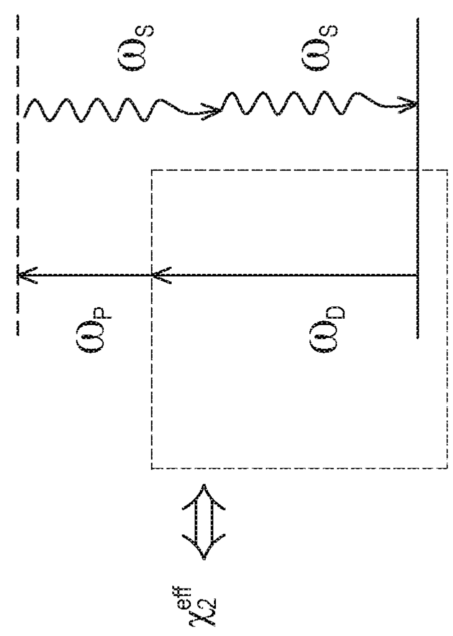
FIG. 3B shows a virtual level diagram of a dual-pumped spontaneous four-wave mixing process for generating squeezed light, according to an embodiment of the present disclosure.

With reference to FIGS. 3A and 3B, a squeezed light generating process by combining two photon sources to pump photons to the input port of a photon circuit is further examined. Particularly, FIG. 3A shows a photonic circuit 20 for generating squeezed light via an SFWM process by combining two photon sources to couple to the same port of a single rail optical waveguide, according to an embodiment. Combining two photon sources may be useful in particular applications for a plurality of reasons as will be understood by those of skill in the art. As a first fold, it may be useful to combine one source that is in the form of a pulsed laser and another source as an external pumping laser to produce a composite pumped pulsed source for use in the classical domain. As a second fold, it may be useful to combine two sources that generate photons of different frequencies as input to a single port to control physical processes such as SFWM that may occur within an optical resonator.

Squeezed light (also referred to light in a squeezed state) refers to light in which the electric field strength for some phases has a quantum uncertainty (also referred to as noise) smaller than that of a coherent state. A wide range of applications can benefit from high quality sources of squeezed light. For example, in metrology, using squeezed light allows certain optical sensors to overcome the shot noise limit and achieve sensitivities many times higher than possible with conventional light sources. In quantum communications, squeezed light can be used to distribute entanglement, thereby assisting cryptographic key distribution protocols. Squeezed light sources can also be used to deterministically generate massive highly entangled quantum states, enabling the construction of scalable quantum simulation and computation devices operating in the optical domain using a continuous variable encoding.

The photonic circuit 20 includes a ring resonator 22 characterized by a third-order nonlinear optical susceptibility. A drive light source 24 is in optical communication with the ring resonator 22 and configured to send a drive light beam 28 to the ring resonator 22 via an optical waveguide 32. The drive light beam 28 may include a continuous wave (CW) light beam. A pump light source 26 is in optical communication with the ring resonator 22 and configured to send a pump light beam 30 to the ring resonator 22 via the optical waveguide 32. The pump light beam 30 includes a pulsed light beam. The pump light beam 30 and the drive light beam 28 are configured to generate a signal light beam in a squeezed state of light via an SFWM process occurred in the ring resonator 22.

In some embodiments, the photonic circuit 20 can be constructed on an integrated nanophotonic platform. For example, the drive light source 24 (e.g., a CW semiconductor laser), the pump light source 26 (e.g., a pulsed semiconductor laser), the ring resonator 22, and the optical waveguide 32 can be fabricated on the same semiconductor substrate, thereby forming an integrated squeezed light source. In furtherance of some embodiments, the drive light source 24 and/or the pump light source 26 can include semiconductor lasers. In some embodiments, the drive light source 24 and/or the pump light source 26 can include lasers, light emitting diodes (LEDs), or any other appropriate type of light source. In some embodiments, the ring resonator 22 includes appropriate material that has a strong third order susceptibility. For example, the ring resonator 22 and the waveguide 32 each may include a non-linear optical material (such as silicon nitride or other suitable material including $LiNbO_3$, AlGaAs, InP, or AlN) surrounded by an oxide layer (such as silicon dioxide) that is disposed over a semiconductor substrate (such as a silicon substrate). Further, the ring resonator and the optical waveguides may have different material compositions.

In some embodiments, the power of the drive light beam 28 can be ten times or greater than the power of the pump light beam 30. In some embodiments, the power of the drive light beam 28 can be about 20 mW or greater. In one implementation, approximately 100 mW of drive power from the drive light beam 28 can be coupled to the ring resonator 22. Only a few mW or less of pulsed pump power from the pump light beam 30 can produce squeezed light having a squeezing factor (or squeeze level) of several dB. The generated squeezed state can be engineered to have single-temporal-mode nature by over-coupling the pulsed pump resonance (i.e., over-coupling between the pump light beam 30 and the ring resonator 22) via a couple region 34 based on Mach-Zehnder interferometer (MZI) and driving the four-wave mixing with a short pulse duration, without seriously compromising the efficiency. More modest over-coupling of the signal resonance (i.e., over-coupling between the signal light beam 36 and the ring resonator 22) can mitigate losses, thereby allowing nearly pure states to be generated. As used herein, pure states here refers to quantum mechanical states that are not entangled with other degrees of freedom (e.g., scattering modes).

In some embodiments, the drive light source 24 and/or the pump light source 26 are tunable so as to control the properties of the signal light beam 36. The magnitude and angle of the squeezing parameters can be determined by the product of the amplitudes of the drive light beam 28 and the pump light beam 30. Accordingly, the magnitude and angle of the squeezing can be controlled by modulating one or both of the input beams 28 and 30. In addition, the squeezing angle can be locked to the sum phase of the drive light beam 28 and the pump light beam 30. Furthermore, the squeezing factor can be controlled by the product of the powers of the two input beams 28 and 30. The squeezed output can therefore be calibrated against and controlled by the input powers and phases.

In some implementations, the output frequency of the drive light source 24 and/or the pump light source 26 can be tunable so as to change the squeezing factor of the signal light beam 36. In some implementations, the power of the drive light source 24 and/or the pump light source 26 can be tunable so as to change the squeezing factor of the signal light beam 36. In some implementations, the relative phase between the drive light source 24 and the pump light source 26 can be tunable so as to change the phase of the signal light beam 36.

The mechanism of squeezing underlying the photonic circuit 20 is naturally suited to engineering highly tunable devices with controllable temporal mode structure. More specifically, the wavelengths of the drive light beam 28 and the pump light beam 30 can be readily tunable. In addition, removal of unwanted pump light and suppression of unwanted spurious light can also be relatively easily achieved (e.g., via couplers). The resulting squeezed light source is therefore suited for quantum computing applications.

The ring resonator 22 can accommodate a number of resonant optical modes J, each of which is assigned a quantum-mechanical annihilation operators $b_J$. In the ring resonator 22, three optical modes are of interest here, i.e., the drive mode D, the signal mode S, and the pump mode P, with corresponding optical angular frequencies $\omega_D$, $\omega_S$, and $\omega_P$. These resonances may not be evenly spaced in their intrinsic configuration (e.g., due to material and modal dispersion). Accordingly, regarding quantum-mechanical annihilation operators $b_J$, $b_D$ represents the resonant optical mode of the drive light beam 28, $b_P$ represents the resonant optical mode of the pump light beam 30, and $b_S$ represents the resonant optical mode of the signal light beam 36.

FIG. 3B shows a virtual level diagram of the dual-pumped spontaneous four-wave mixing for generating squeezed light, according to an embodiment. In the presence of this effective second-order nonlinearity, a weaker coherent pump pulse in the P mode thereby produces photon pairs via parametric fluorescence into the S mode. Using a strong CW pump in conjunction with the intrinsic $\chi 3$ response can mediate an effective $\chi 2$ interaction (labelled as $\chi_2^{eff}$ in FIG. 3) in an integrated resonator. Particularly, to bring the desired parametric fluorescence process into resonance, a strong CW drive beam can be used to induce a nonlinear detuning via cross-phase modulation, pushing the D, S, and P resonances into an evenly spaced configuration in frequency. The pump mode P is driven by a sufficiently weak pump light beam 30, which only induces negligible self-phase modulation and cross-phase modulation. The signal mode S carries the generated squeezed light of interest. The third-order nonlinear optical response of the resonator material leads to an interaction Hamiltonian (representing the energy of the four-wave system) that contains a coefficient Λ is related to the resonator structure and the strength of the third-order optical nonlinearity of the resonator. For a ring resonator, the coefficient Λ can be written as $\Lambda \approx \hbar \omega_S v_g^2 \gamma_{NL}/2L$, where $\hbar$ is reduced Planck constant, $\omega_S$ is the frequency of the signal light beam 36, $v_g$ is the group velocity, L is the resonator length, and $\gamma_{NL}$ the waveguide nonlinear parameter. This interaction Hamiltonian is known to lead to a squeezed state of the signal S mode within the resonator via parametric fluorescence. This mode is coupled to the channel field (i.e., optical field within the waveguide 32), producing a propagating squeezed light output.

During squeezed light generation, a ring resonator may accommodate hundreds or even thousands of resonances. Out of these resonances (also referred to as auxiliary resonances or unwanted resonances), at least two processes are relevant to the performance in generating squeezed light. The first one gives rise to unwanted spontaneous four-wave mixing, leading to the generation of spurious photons in the S mode. The second one gives rise to Bragg-scattering four-wave mixing, leading to an additional source of loss on the squeezed state generated in the S mode. Suppression of these unwanted photons is therefore beneficial to yield a highly-pure low-noise squeezed output (or referred to as a higher squeeze level, measured in dB).

Therefore, the ring resonator topology and dimensions can be carefully picked to generate squeezed light with high spectral purity and high optical power efficiency. The quality of the squeezed light output, in terms of contamination by unwanted spurious generated light and by excess anti-squeezing due to losses, can be optimized by several approaches. One approach is to add one or more extra ring resonators to the ring resonator structure. Adding extra ring resonators brings advantages in multi-folds compared to known squeezed light sources with a single ring resonator. In some embodiments, the extra ring resonators introduce over-coupling between the signal light beam and the optical resonators so as to mitigate intra-resonator losses that might degrade the achievable squeezing by mixing in vacuum fluctuations from scattering modes. In some other embodiments, it may not always be desirable to over-couple the D and P resonances, as they are usually most efficiently driven at critical coupling. To address this trade-off, racetrack couplers can be used to achieve independent control over the coupling conditions of different resonances. In some other embodiments, the unwanted photons can be suppressed using an auxiliary coupler. Generation of unwanted photons in the S mode via other spontaneous four-wave mixing from singly-pumped processes typically involves an auxiliary resonance other than the S, P or D modes. Such generation can thus be suppressed by constructing a device to corrupt the corresponding extra resonances involved, either by detuning them away from the energy-conserving condition, degrading their quality factors, or removing the unwanted resonance altogether.

FIGS. 4-9 illustrate various embodiments of photonic circuitry with multiple ring resonators. The ring resonators may couple in achieving a high squeeze level. Accordingly, the exemplary photonic circuitry are also referred to as coupled co-resonator structures.

Figure 4:
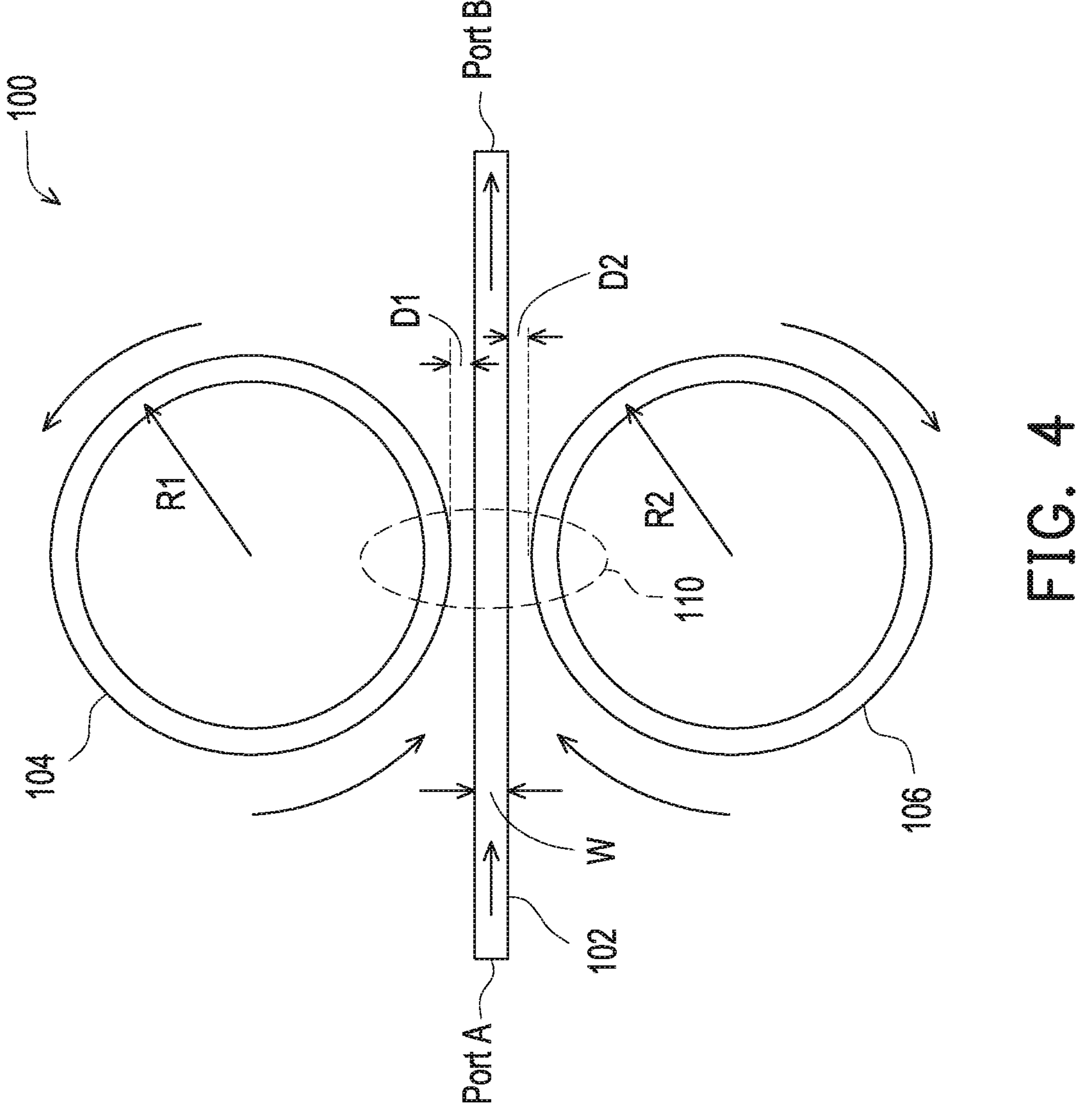
FIG. 4 illustrates a diagram of a photonic circuit with two ring resonators in parallel coupling, according to an embodiment of the present disclosure.

Referring to FIG. 4, a photonic circuit 100 includes a first ring resonator 104, a second ring resonator 106, and an optical waveguide 102. The first ring resonator 104, second ring resonator 106, and the optical waveguide 102 each may include a non-linear optical material (such as silicon nitride or other suitable material including $LiNbO_3$, AlGaAs, InP, or AlN) surrounded by an oxide layer (such as silicon dioxide) that is disposed over a semiconductor substrate (such as a silicon substrate). Further, the ring resonators and the optical waveguides may have different material compositions. The optical waveguide 102 is in the form of a single rail and provides a path for source (incident) photons from a single photon source or combined photon sources as discussed above. The ring resonators 104 and 106 are disposed on opposing sides of the optical waveguide 102. In other words, the ring resonators 104 and 106 sandwich the optical waveguide 102.

The first ring resonator 104 has a radius R1, the second ring resonator 106 has a radius R2, and the optical waveguide 102 has a width W. In some embodiments, R1 and R2 each range from about 5 um to about 12 um. In some embodiments, W ranges from about 1 um to about 2 um. The ring resonators 104 and 106 may be spaced slightly apart from the optical waveguide 102 for a distance D1 and D2, respectively. In some embodiments, D1 and D2 each range from about 100 nm to about 1 um. In some embodiments, R1 equals R2 (R1=R2), and D1 equals D2 (D1=D2). In some alternative embodiments, the ring resonators 104 and 106 may be independently trimmed or tuned to have different resonances and coupling characteristics. For example, R1 may be smaller than R2 (R1<R2), and D1 may be smaller than D2 (D1<D2). The above numeral values are exemplary, and the dimensions and intervals of the ring resonators 104 and 106 and the optical waveguide 102 can be variously formed in consideration of the wavelength of the incident light and the desired squeeze level.

Photon source(s) provides photons to the optical waveguide 102 at Port A. the source (incident) photons propagate in the direction of Port B. A region is indicated as coupling region 110 that is representative of the portion of the photonic circuit 100 where evanescent coupling (near-field coupling) occurs between the ring resonators 104 and 106 and the optical waveguide 102. As such evanescent coupling is often confined in a small region surrounding a point on a ring resonator that is in the shortest distance to a optical waveguide, the coupling mechanism in FIG. 4 is also termed as near-field point coupling. Some fraction of the source photons coupled from the optical waveguide 102 enter into the first ring resonator 104, some fraction of the source photons coupled from the optical waveguide 102 enter into the second ring resonator 106, and the remaining fraction of the source photons in the optical waveguide 102 continue to propagate along the optical waveguide 102 and exit the optical waveguide 102 at Port B. Of the fractions of photons that are coupled into the ring resonators 104 and 106, some further fraction undergoes a spontaneous physical process, such as a SFWM process, as they propagate through the ring resonators 104 and 106. The optical paths in the ring resonators 104 and 106 have opposite directions, with one in a counterclockwise direction and anther one in a clockwise direction. Of the total amount of photons circulating in the ring resonators 104 and 106, a fraction having undergone a spontaneous physical process is coupled back into the optical waveguide 102 through the coupling region 110 and propagate towards the Port B.

The overall coupling mechanism is referred to as near-field-point-coupled in and near-field-point-coupled out. The extra ring resonator 106 provides more fractions of photons going through an SFWM process, which increases photon transition rate. Further, as discussed above, introducing over-coupling by adding an extra ring resonator mitigates intra-resonator losses that might degrade the achievable squeezing from scattering modes.

Figure 5:
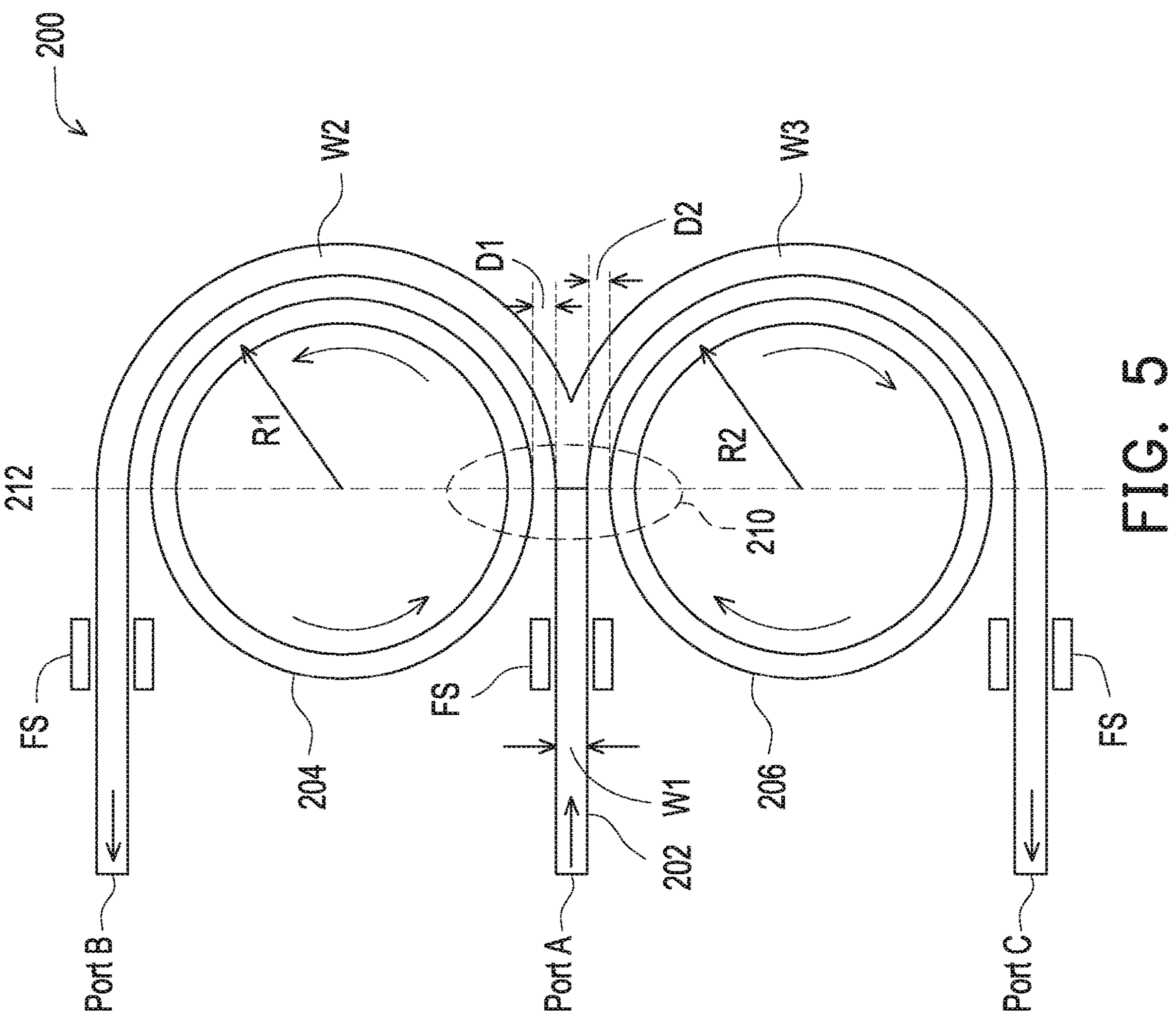
FIG. 5 illustrates a diagram of a photonic circuit with two ring resonators in parallel coupling, according to an embodiment of the present disclosure.

Referring to FIG. 5, a photonic circuit 200 includes a first ring resonator 204, a second ring resonator 206, and an optical waveguide 202. The first ring resonator 204, second ring resonator 206, and an optical waveguide 202 each may include a non-linear optical material (such as silicon nitride or other suitable material including $LiNbO_3$, AlGaAs, InP, or AlN) surrounded by an oxide layer (such as silicon dioxide) that is disposed over a semiconductor substrate (such as a silicon substrate). The optical waveguide 202 has a first portion (input portion) in the form of a straight rail that provides an input Port A for incident photons. The optical waveguide 202 further has second and third portions (output portions) split from the first portion. The second portion has an arc shape partially circles the first ring resonator 204 conformally with a constant distance D1 (i.e., the arc and the first ring resonator 204 are concentric) and a single rail connecting to an end of the arc, which provides an exit Port B. The third portion has an arc shape partially circles the second ring resonator 206 conformally with a constant distance D2 (i.e., the arc and the second ring resonator 204 are concentric) and a single rail connecting to an end of the arc, which provides an exit Port C.

The ring resonators 204 and 206 are disposed on opposing sides of the first portion of the optical waveguide 202. In other words, the ring resonators 204 and 206 sandwich the first portion of the optical waveguide 102. The arc of the second portion of the optical waveguide 202 partially surround the first ring resonator 204 for a half circle in the illustrated embodiment, such that the photons exit Port B in a direction opposite to the incident path from Port A. The arc of the third portion of the optical waveguide 202 partially surround the second ring resonator 206 for a half circle in the illustrated embodiment, such that the photons exit Port C in a direction opposite to the incident path from Port A.

The first ring resonator 204 has a radius R1, the second ring resonator 206 has a radius R2, the input portion of optical waveguide 102 has a width W1, the arc surrounding the first ring resonator 204 has a width W2, and the arc surrounding the second ring resonator 206 has a width W3. In some embodiments, R1 and R2 each range from about 5 um to about 12 um. In some embodiments, W1, W2, and W3 each range from about 1 um to about 2 um. The ring resonators 204 and 206 may be spaced slightly apart from the optical waveguide 202 for a distance D1 and D2, respectively. In some embodiments, D1 and D2 each range from about 100 nm to about 1 um. In some embodiments, R1 equals R2 (R1=R2), D1 equals D2 (D1=D2), and W2 equals W3 but both smaller than W1 (W2=W3<W1). In some alternative embodiments, the ring resonators 204 and 206 may be independently trimmed or tuned to have different resonance and coupling characteristics. For example, R1 may be smaller than R2 (R1<R2), D1 may be smaller than D2 (D1<D2), and W2 may be smaller than W3 which is further smaller than W1 (W2<W3<W1). The above numeral values are exemplary, and the dimensions and intervals of the ring resonators 204 and 206 and the optical waveguide 202 can be variously formed in consideration of the wavelength of the incident light and the desired squeeze level.

Photon source(s) provides photons to the optical waveguide 202 at Port A. The source (incident) photons propagate in the direction towards a splitting region 210. The splitting region 210 may include a beam splitter, which divides the straight rail into a first arc concentric with the fist ring resonator 204 and a second arc concentric with the second ring resonator 206. The beam splitter may be located on a virtual line 212 that travels through centers of the two ring resonators 204 and 206. The splitting region 210 also is the starting point where evanescent coupling (near-field coupling) occurs. Evanescent coupling is not confined in the splitting region 210 alone, but also conformally along the curvature of the ring resonators in the paths of the arcs. Such a coupling mechanism in FIG. 5 is also referred to as near-field conformal coupling. Some fraction of the source photons coupled from the optical waveguide 202 enter into the first ring resonator 204, some fraction of the source photons coupled from the optical waveguide 202 enter into the second ring resonator 206, and the remaining fraction of the source photons in the optical waveguide 202 continue to propagate along the optical waveguide 202 and exit the optical waveguide 202 at either Port B or Port C. Of the fractions of photons that are coupled into the ring resonators 204 and 206, some further fraction undergoes a spontaneous physical process, such as a SFWM process, as they propagate through the ring resonators 204 and 206. The optical paths in the ring resonators 204 and 206 have opposite directions, with one in a counterclockwise direction and anther one in a clockwise direction. Of the total amount of photons circulating in the ring resonators 204 and 206, some fraction having undergone a spontaneous physical process is coupled back into the optical waveguide 202 through the arcs and propagate towards Port B or Port C, respectively. The first and second arcs provide longer distance for evanescent coupling to take place and increase squeezed photon recollection rate, which effectively mitigate losses (such as bending losses occurred in a ring resonator).

The overall coupling mechanism is referred to as near-field-conformal-coupled in and near-field-conformal-coupled out. The extra ring resonator 206 provides more fractions of photons going through an SFWM process, which increases photon transition rate. Further, as discussed above, introducing over-coupling by adding an extra ring resonator mitigates intra-resonator losses that might degrade the achievable squeezing from scattering modes.

Optionally, the photonic circuit 200 may also include tunable and programmable phase shifters (denoted as "FS" in figures) to control phase coherency between the ring resonators and the optical waveguide(s). The phase shifters may be implemented by a method of mechanical optics (e.g., MEMS or NEMS), thermal-optics, electro-optics, or acousto-optics. In the illustrated embodiment, each of the three straight rails has a phase shifter for phase and/or intensity balance.

Still referring to FIG. 5, in the above illustration, Port A is an input port, and Port B and Port C are two output ports. Alternatively, Port B may be a first input port, Port C may be a second input port, and Port A may be an output port. The region 210 is thus a combining region, which functions as a combiner to merge the photons from the two arcs. The overall coupling mechanism is still near-field-circumferential-coupled in and near-field-conformal-coupled out.

Figure 6A:
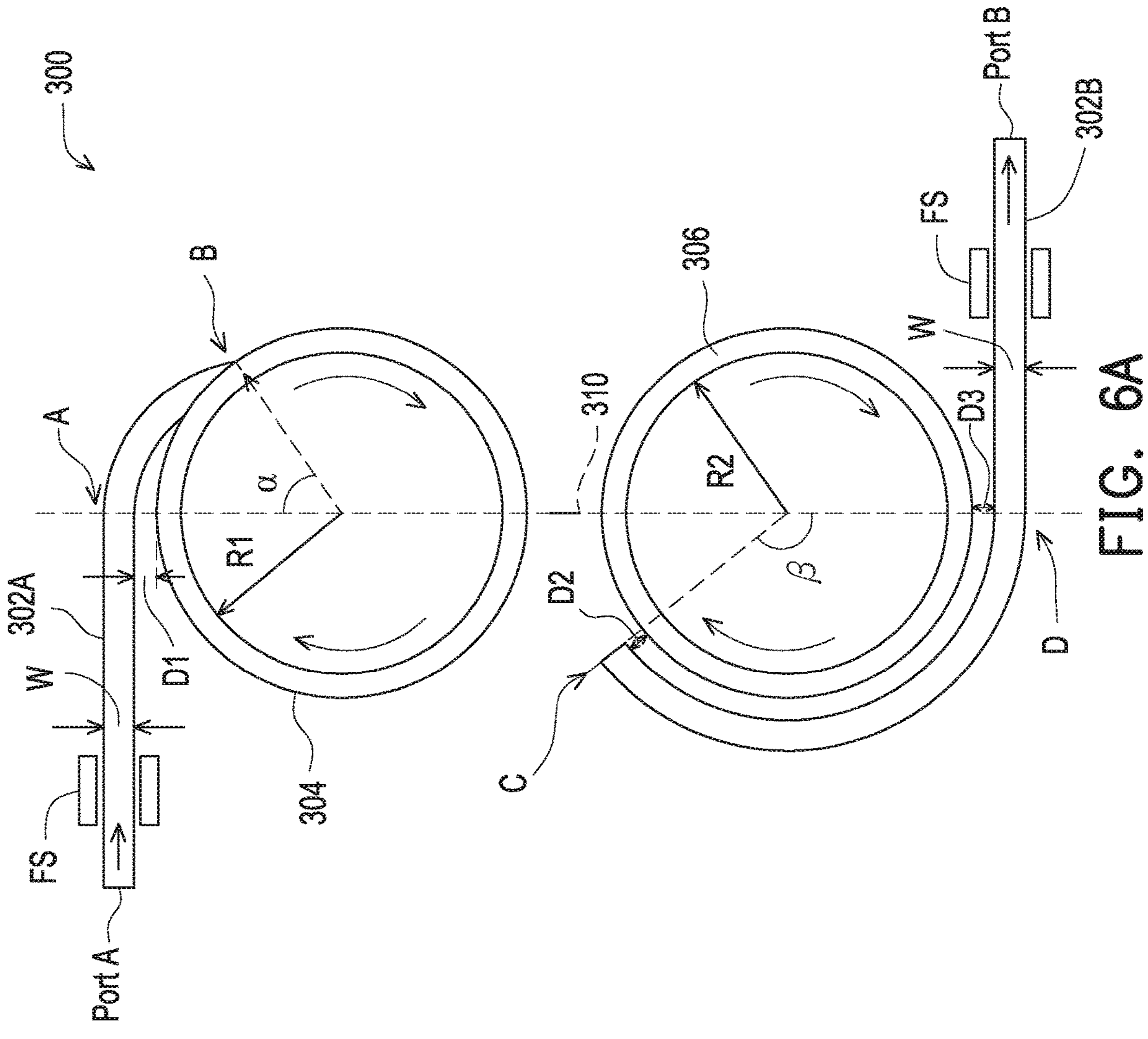
FIGS. 6A, 6B, and 6C illustrate diagrams of a photonic circuit with two ring resonators in serial coupling, according to some embodiments of the present disclosure.
Figure 6B:
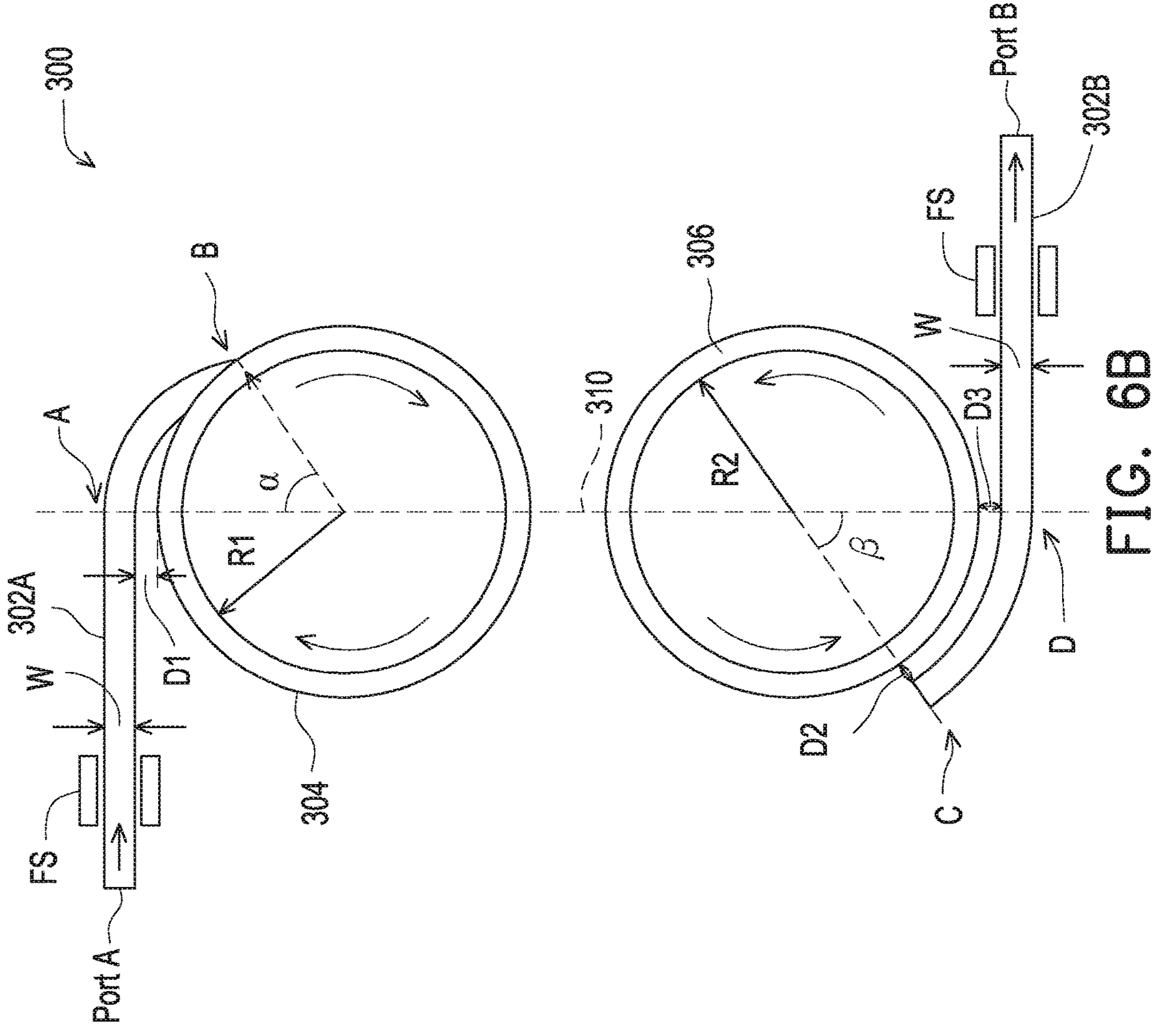
Figure 6C:
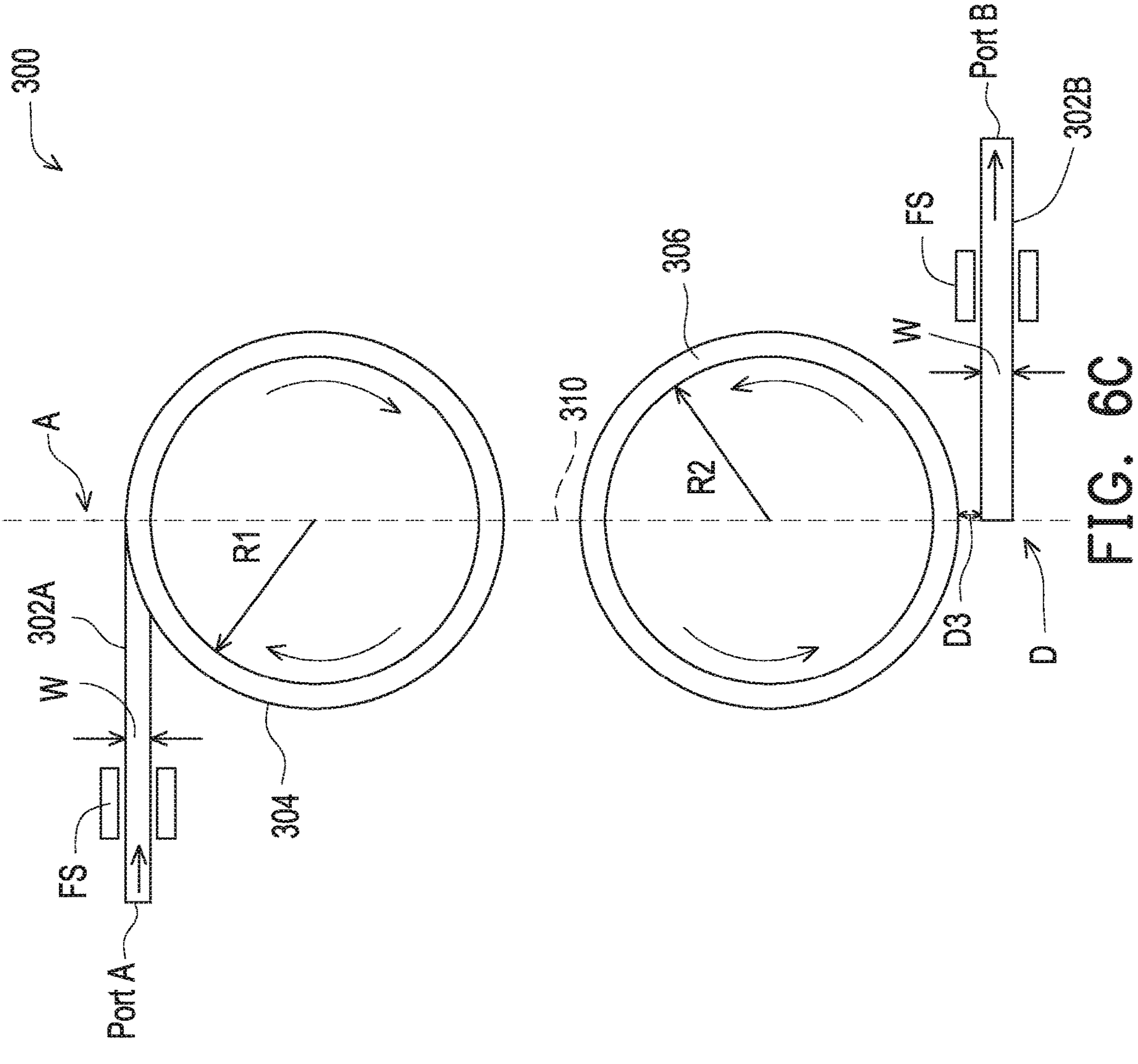

FIGS. 6A-6C illustrate various embodiments of a photonic circuit 300 including two ring resonators in serial-coupling (or serial-feeding). Unlike the photonic circuit 100 (FIG. 4) and the photonic circuit 200 (FIG. 5), in which photons propagate into the two ring resonators simultaneously (or feeding in parallel, also referred to as parallel-feeding or parallel-coupling), in serial-coupling photons travel through the ring resonators in sequence. Referring to FIG. 6A, the photonic circuit 300 includes a first optical waveguide 302A, a first ring resonator 304, a second ring resonator 306, and a second optical waveguide 302B. The first and second ring resonators 304 and 306 and the first and second optical waveguide 302A and 302B each may include a non-linear optical material (such as silicon nitride or other suitable material including $LiNbO_3$, AlGaAs, InP, or AlN) surrounded by an oxide layer (such as silicon dioxide) that is disposed over a semiconductor substrate (such as a silicon substrate). Further, the ring resonators and the optical waveguides may have different material compositions.

The first optical waveguide 302A has a first portion (input portion or rail portion) in a form of a straight rail that has an input port Port A and a second portion (injection portion or tapering portion) that starts tapering towards the circumference of the first ring resonator 304 at a point A and intersects the circumference of the first ring resonator 304 at a point B. That is, a distance between the circumference of the first ring resonator 304 and the tapering portion decreases from a distance D1 at point A to zero at point B. Source photons are directly injected into the first ring resonator 304 through point B. Compared with coupling photons through near-field coupling, which typically has a 10%-40% optical power efficiency, direct injection may achieve nearly 100% optical power efficiency.

The second optical waveguide 302B has a first portion (coupling portion or arc portion) in a form of an arc that partially circles the second ring resonator 306 and a second portion (output portion or rail portion) in the form of a straight rail that has an output port Port B. By partially circling the second ring resonator 306, the coupling path is extended, and efficiency of collecting photons escaping from the second ring resonator 306 is increased, which mitigates bending loss occurred in a ring resonator. The distances between the circumference of the second ring resonator 306 and the starting point C and ending point D of the coupling portion are denoted as D2 and D3, respectively. The arc shape of the coupling portion may partially circle the second ring resonator 306 conformally (i.e., the arc and the ring are concentric) with a constant distance (i.e., D2=D3). Alternatively, the arc shape of the coupling portion may gradually taper away from the second ring resonator 306 (i.e., D2<D3). The distances D1 and D3 may equal (i.e., D1=D3) or are different (i.e., D1≠D3), depending on device performance needs. The starting point A of the injection portion of the first optical waveguide 302A and the ending point D of the coupling portion of the second optical waveguide 302B may both land on a virtual line 310 traveling through centers of the two ring resonators 304 and 306.

The ring resonators 304 and 306 are disposed between the straight rails of the first and second optical waveguides 302A and 302B. The first ring resonator 204 has a radius R1, the second ring resonator 206 has a radius R2, the first and second optical waveguides 302A and 302B each have a width W. In some embodiments, R1 and R2 each range from about 5 um to about 12 um. In some embodiments, W ranges from about 1 um to about 2 um. In some embodiments, distances D1, D2, and D3 each range from about 100 nm to about 1 um. The above numeral values are exemplary, and the dimensions and intervals of the ring resonators 304 and 306 and the optical waveguides 302A and 302B can be variously formed in consideration of the wavelength of the incident light and the desired squeeze level. In the illustrated embodiment, R1 equals R2 (R1=R2). In some alternative embodiments, the ring resonators 304 and 306 may be independently trimmed or tuned to have different resonance and coupling characteristics. For example, R1 may be different from R2 (R1≠R2). In one example, R1 is larger than R2 (R1>R2) with an optical path length inside the first ring resonator 304 as an integer multiple of the wavelength of the pump photons (such that pump photons may resonate in the first ring resonator 304) and an optical path length inside the second ring resonator 306 as an integer multiple of the wavelength of the signal photon and an integer multiple of the wavelength of the idler photon (such that both the signal photon and the idler photon may resonate in the second ring resonator 306).

Photon source(s) provides photons to the first optical waveguide 302A at Port A. The source (incident) photons propagate in the direction towards the injection portion that merges with the circumference of the first ring resonator 304. Due to the direct injection, almost all the source photons enter the first ring resonator 304 with a nearly 100% optical power efficiency. The second ring resonator 306 is coupled to the first ring resonator 304 through near-field coupling. The optical paths in the ring resonators 304 and 306 have opposite directions, with one in a counterclockwise direction and anther one in a clockwise direction. An SFWM process may occur in both the ring resonators 304 and 306, and thus a larger fraction of photons undergoes the SFWM process and more squeezed photons are generated than using a single ring resonator. The photons (if not dissipated) eventually are coupled to the second optical waveguide 302B through its arc-shape coupling portion and propagate towards the Port B. The arc portion provides a longer path for collecting squeezed photons and increases photon recollection rate, which effectively mitigate losses (such as bending losses occurred in a ring resonator). Such coupling is also referred to as near-field circumferential coupling. The above discussed near-field conformal coupling can be considered as a special type of near-field circumferential coupling under the condition of a distance between a ring resonator and an arc portion remains constant (i.e., D2=D3).

A central angle subtended by the tapering portion of the first optical waveguide 302A (from point A to point B) is denoted as central angle α, and a central angle subtended by the coupling portion of the second optical waveguide 302B (from point C to point D) is denoted as central angle β. In various embodiments, the central angle β may be larger than the central angle α. In some embodiments, the central angle α is less than about 90°, such as in a range from about 30° to about 90°. In some embodiments, the central angle β is above 30°. In the embodiment as illustrated in FIG. 6A, the central angle β is larger than about 90°, such as in a range from about 1000 to about 170°. In some alternative embodiments, the central angle β is less than about 90°, such as in a range from about 30° to about 90°. FIG. 6B illustrates an alternative embodiment of the photonic circuit 300 substantially similar with the one in FIG. 6A but with the central angle β less than about 90°, such as around 45°. FIG. 6C illustrates yet another embodiment of the photonic circuit 300 in which the first optical waveguide 304 has the straight rail of the input portion tangentially in contact with the circumference of the first ring resonator 304 at point A without having a tapering portion. That is, the point A lands on the circumstance of the first ring resonator 304. The photons are still directly injected into the first ring resonator 304. Further, the second optical waveguide 302B has the straight rail as the output portion having a distance D3 from the circumference of the second ring resonator 306 to receive photons by near-field point coupling without relying on an arc portion's near-field circumferential coupling.

Optionally, the photonic circuit 300 may also include tunable and programmable phase shifters (denoted as "FS" in figures) to control phase coherency between the ring resonators and the optical waveguide(s). The phase shifters may be implemented by a method of mechanical optics (e.g., MEMS or NEMS), thermal-optics, electro-optics, or acousto-optics. In the illustrated embodiment, each of the two straight rails of the first and second optical waveguides 302A and 302B has a phase shifter for phase and/or intensity balance.

Figure 7:
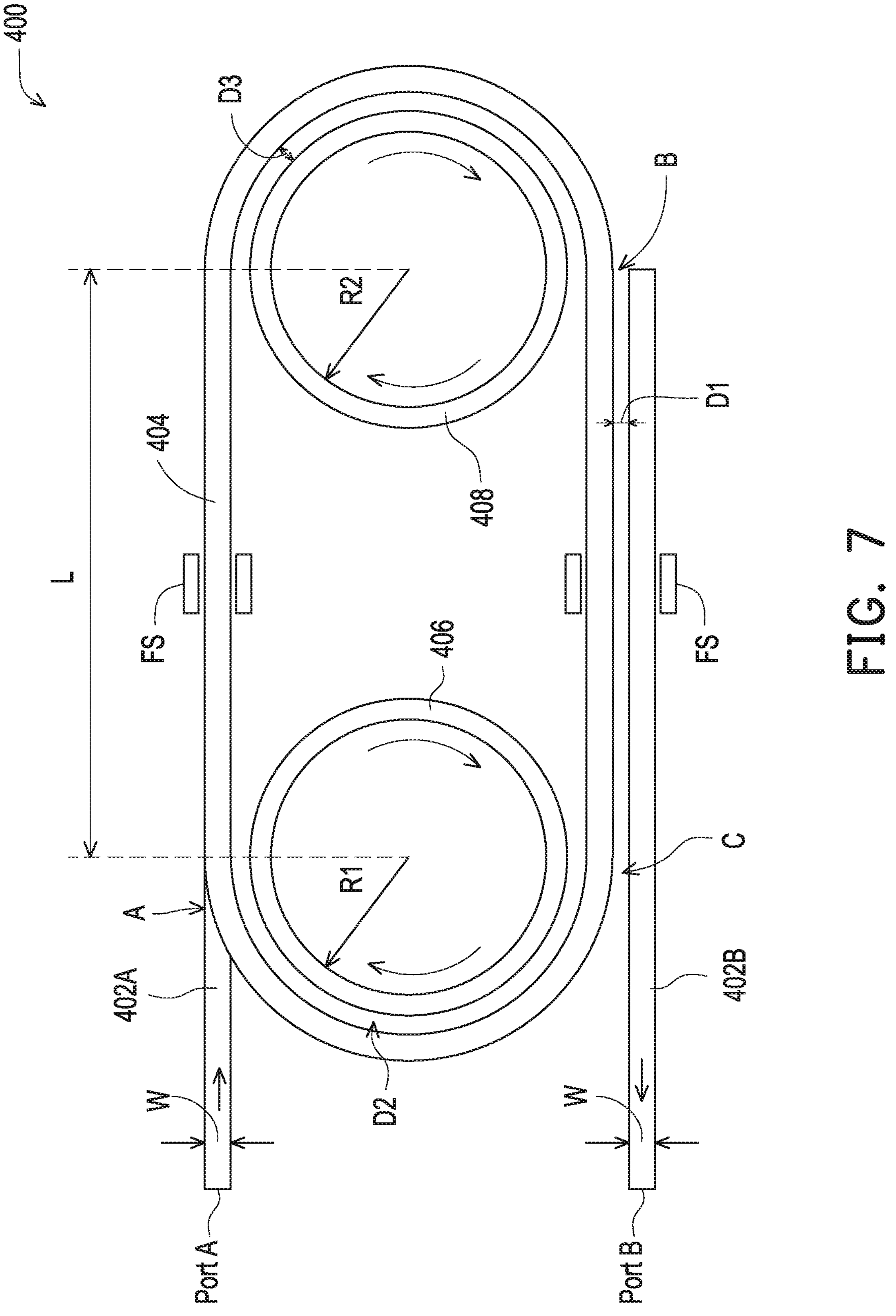
FIG. 7 illustrates a diagram of a photonic circuit with racetrack-shape resonators and two ring resonators, according to an embodiment of the present disclosure.

As discussed above, racetrack couplers can be used to achieve independent control over the coupling conditions of different resonances. FIG. 7 illustrates an exemplary embodiment including a racetrack-shape resonator coupled with multiple ring resonators. Particularly, referring to FIG. 7, a photonic circuit 400 includes a racetrack-shape resonator 404, a first ring resonator 406 and a second ring resonator 408, a first optical waveguide 402A, and a second optical waveguide 402B. The resonators 404, 406, and 408, and optical waveguides 402A and 402B each may include a non-linear optical material (such as silicon nitride or other suitable material including $LiNbO_3$, AlGaAs, InP, or AlN) surrounded by an oxide layer (such as silicon dioxide) that is disposed over a semiconductor substrate (such as a silicon substrate). Further, the ring resonators and the optical waveguides may have different material compositions.

The racetrack-shape resonator 404 has an elongated shape including two opposing arcs and two edges connecting the two arcs. The first ring resonator 406 with a radius R1 is positioned within the racetrack-shape resonator 404 and in proximity of one arc. The second ring resonator 408 with a radius R2 is positioned within the racetrack-shape resonator 404 and in proximity of another arc. The ring resonators 406 and 408 each are concentric with the respective arcs. The regions between the arcs and the ring resonators provide near-field conformal coupling between the racetrack-shape resonator and the ring resonators. An optical path length inside the racetrack-shape resonator 404 may be an integer multiple of the wavelength of the pump photons (such that pump photons may resonate in the racetrack-shape resonator 404). The ring resonators 406 and 408 may be identical (i.e., R1=R2). For example, an optical path length inside each of the ring resonators 406 and 408 is an integer multiple of the wavelength of the signal photon and an integer multiple of the wavelength of the idler photon (such that both the signal photon and the idler photon may resonate in the ring resonators 406 and 408). Alternatively, the ring resonators 406 and 408 may be different (i.e., R1≠R2). For example, an optical path length inside the ring resonator 406 may be an integer multiple of the wavelength of the signal photon, and an optical path length inside the ring resonator 408 may be an integer multiple of the wavelength of the idler photon, or vice versa.

In some embodiments, the second optical waveguide 402B is spaced from an edge of the racetrack-shape resonator 404 for a distance D1, the ring resonators 406 is spaced from one arc of the racetrack-shape resonator 404 for a distance D2, the ring resonator 408 is spaced from another arc of the racetrack-shape resonator 404 for a distance D3, the centers of the ring resonators 406 and 408 are spaced for a distance L, the first and second optical waveguides 402A and 402B each have a width W. In some embodiments, each of R1 and R2 ranges from about 5 um to about 12 um. In some embodiments, W ranges from about 1 um to about 2 um. In some embodiments, each of D1-D3 ranges from about 100 nm to about 1 um. The ring resonators 406 and 408 may be independently trimmed or tuned to have same or different resonances and coupling characteristics. In some embodiments, R1 equals R2 (R1=R2) and D2 equals D3 (D2=D3). In some embodiments, R1 is larger than R2 (R1>R2) and D2 is smaller than D3 (D2<D3). In some embodiments, R1 is smaller than R2 (R1<R2) and D2 is larger than D3 (D2>D3). The above numeral values are exemplary, and the dimensions and intervals of the resonators 404, 406, and 408 and the optical waveguides 402A and 402B can be variously formed in consideration of the wavelengths of the S, D, P resonances and the desired squeeze level. In some embodiments, the distance L is about 3.5 times to about 10 times of the radius R (given R=R1=R2). This ratio is not trivial. If L is less about 3.5 times of R, the two ring resonators may be too close and over-couple the D and P resonances; if L is larger than 5 time of R, the racetrack-shape resonator 404 may become unnecessarily large and cost valuable circuit area.

The first optical waveguide 402A has the form of a straight rail that aligns and connects with an edge of the racetrack-shape resonator 404 at point A. Photon source(s) provides photons to the first optical waveguide 402A at Port A. The source (incident) photons propagate in the direction towards point A and enter the racetrack-shape resonator 404. Due to the direct injection, almost all the photons enter the racetrack-shape resonator 404 with a nearly 100% optical power efficiency. The optical paths in the racetrack-shape resonator 404 and ring resonators 406 and 408 have the same directions, such as in the clockwise direction. The second optical waveguide 402B has the form of a straight rail in parallel with another edge of the racetrack-shape resonator 404. The straight rail may accompany the whole length of the edge of the racetrack-shape resonator 404 from its starting point B to its ending point C. This provides a longer distance for evanescent coupling to take place and increases squeezed photon recollection rate, which effectively mitigate losses (such as bending losses occurred in a ring resonator).

Optionally, the photonic circuit 400 may also include tunable and programmable phase shifters (denoted as "FS" in figures) to control phase coherency between the ring resonators and the optical waveguide(s). The phase shifters may be implemented by a method of mechanical optics (e.g., MEMS or NEMS), thermal-optics, electro-optics, or acousto-optics. In the illustrated embodiment, the first edge of the racetrack-shape resonator is tuned by a first phase shifter, and the second edge of the racetrack-shape resonator and the second optical waveguide 402B are tuned by a second phase shifter.

Figure 8A:
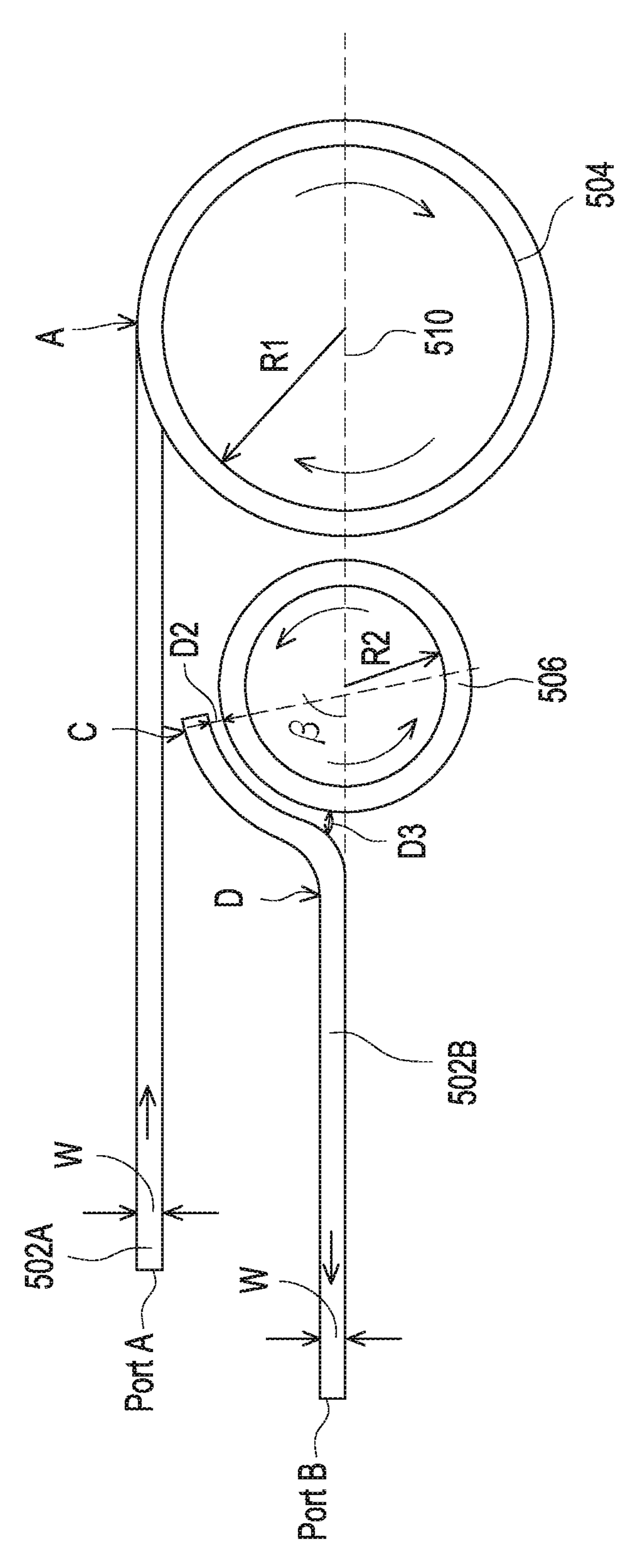
FIGS. 8A and 8B illustrate diagrams of a photonic circuit with two ring resonators of different dimensions, according to some embodiment of the present disclosure.

FIG. 8A shows a photonic circuit 500 including a main ring resonator 504 and an auxiliary ring resonator 506. As discussed above, unwanted photons can be suppressed using an auxiliary coupler. Generation of unwanted photons in the S mode via other spontaneous four-wave mixing may involve an auxiliary resonance other than the S, P or D modes. Such generation can thus be suppressed by constructing a device to corrupt the corresponding extra resonances involved, either by detuning them away from the energy-conserving condition, degrading their quality factors, or removing the unwanted resonance altogether. The photonic circuit 500 also includes a first optical waveguide 502A and a second optical waveguide 502B. The main and auxiliary ring resonators 504 and 506 and the first and second optical waveguide 502A and 502B each may include a non-linear optical material (such as silicon nitride or other suitable material including $LiNbO_3$, AlGaAs, InP, or AlN) surrounded by an oxide layer (such as silicon dioxide) that is disposed over a semiconductor substrate (such as a silicon substrate). Further, the ring resonators and the optical waveguides may have different material compositions.

The first optical waveguide 502A has the form of a straight rail tangentially in contact with the circumference of the main ring resonator 504 at point A. Photon source(s) provides photons to the first optical waveguide 502A at Port A. The source (incident) photons propagate in the direction towards the injection portion that merges with the circumference of the racetrack-shape resonator 404 at point A. Due to the direction injection, almost all the photons enter the main ring resonator 504 with a nearly 100% optical power efficiency. The straight rail of the first optical waveguide 502A may be parallel to a virtual line 510 connecting centers of the main ring resonator 504 and the auxiliary ring resonator 506.

The second optical waveguide 502B has a first portion (coupling portion or arc portion) in a form of an arc that partially circles the auxiliary ring resonator 506 and a second portion (output portion or rail portion) in the form of a straight rail that has an output port Port B. By partially circling the auxiliary ring resonator 506, the near-field circumferential coupling path is extended, and efficiency of collecting squeezed photons escaping from the auxiliary ring resonator 506 is increased, which mitigates bending loss occurred in a ring resonator. The distances between the circumference of the auxiliary ring resonator 506 and the coupling portion are denoted as D2 at the starting potin C and D3 at the ending point D, respectively. The arc shape of the coupling portion may partially circle the auxiliary ring resonator 506 conformally (that is, the arc and the ring are concentric) with a constant distance (i.e., D2=D3). The near-field circumferential coupling is also near-field conformal coupling. Alternatively, the arc shape of the coupling portion may taper away from the auxiliary ring resonator 306 (i.e., D2<D3). The distances D2 and D3 are selected depending on device performance needs. The central angle β in the auxiliary ring resonator 506 may be less than about 90°, such as in a range from about 30° to about 60°. The straight rail of the output portion of the second optical waveguide 502B may align with the virtual line 510 connecting centers of the main ring resonator 504 and the auxiliary ring resonator 506.

The main ring resonator 504 has a radius R1, the auxiliary ring resonator 506 has a radius R2 that is different from R1. The first and second optical waveguides 502A and 502B each have a width W. In some embodiments, R1 and R2 each range from about 5 um to about 12 um. In some embodiments, W ranges from about 1 um to about 2 um. In some embodiments, distances D2 and D3 each range from about 100 nm to about 1 um. The above numeral values are exemplary, and the dimensions and intervals of the ring resonators 504 and 506 and the optical waveguides 502A and 502B can be variously formed in consideration of the wavelength of the incident light and the desired squeeze level. the ring resonators 504 and 506 may be independently trimmed or tuned to have different resonance and coupling characteristics. In the illustrated embodiment, R1 is larger than R2 (R1>R2). Alternatively, R1 may be smaller than R2 (R1<R2).

The main ring resonator 504 induces a squeezed state in the S resonance, which has a frequency equal to the average frequency of the D and P modes. This squeezed state yields a squeezed light output propagating in the main ring resonator 504. The auxiliary ring resonator 506 further tunes the main ring resonator 504 to suppress unwanted four-wave mixing processes by coupling to appropriate resonances and corrupting their ability to generate spurious light in the S mode. The auxiliary ring resonator 506 has a different free spectral range from the main ring resonator 504 and is employed to selectively split, detune, and degrade the quality factor of the extra resonance involved, thereby suppressing the unwanted process while preserving the desired squeezing interaction. The auxiliary ring resonator 506 is coupled to the main ring resonator 504 through near-field coupling. The optical paths in the ring resonators 504 and 506 have opposite directions, with one in a counterclockwise direction and anther one in a clockwise direction.

Figure 8B:
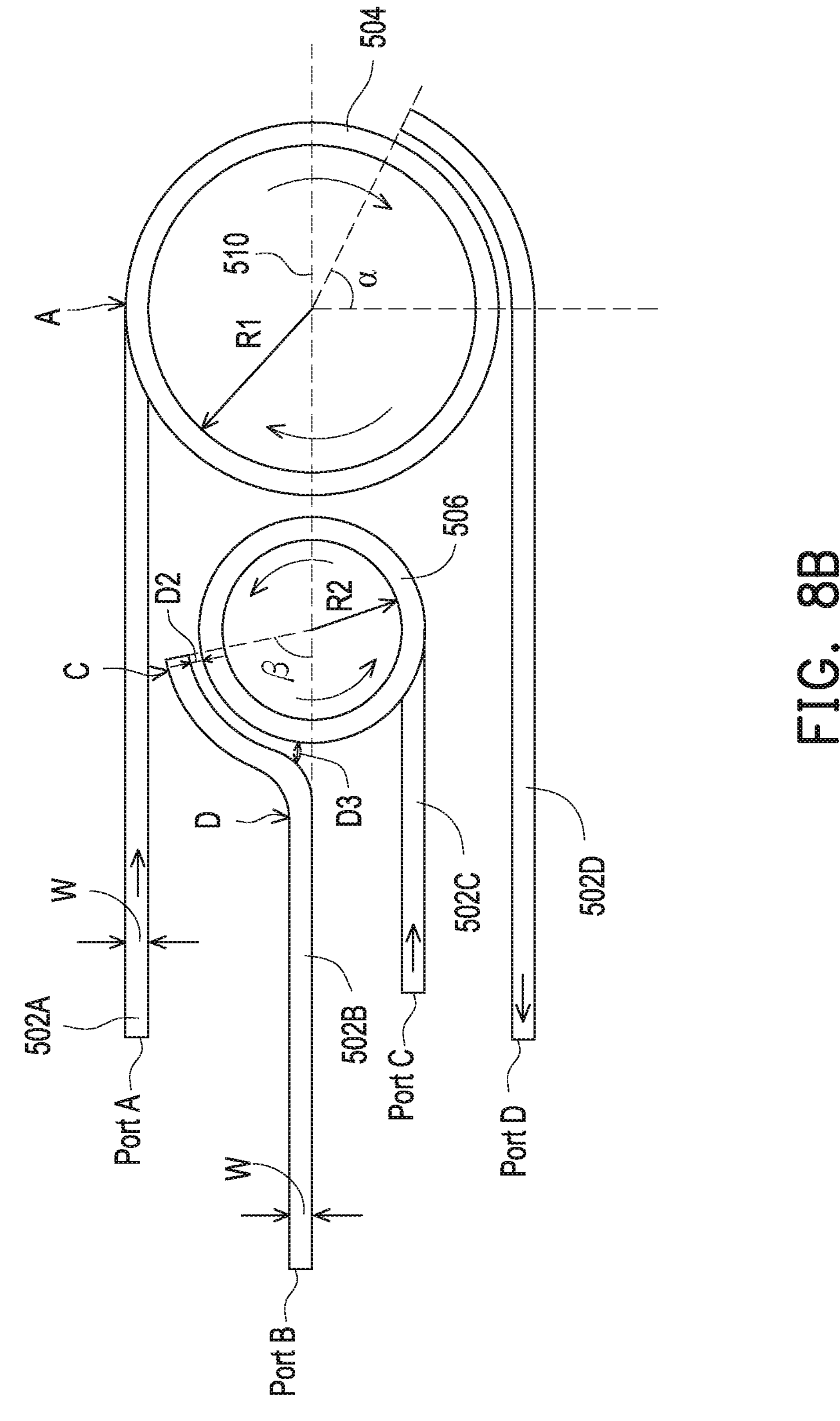

FIG. 8B illustrates an alternative embodiment of the photonic circuit 500 which is substantially similar to the embodiment illustrated in FIG. 8A but with a third optical waveguide 502C and a fourth optical waveguide 502D. It has been observed that even with the same resonator structure, higher optical power circulating in the resonators leads to higher squeeze level. The extra optical waveguides 502C and 502D are able to pump more optical power into the photonic circuit 500 and further increase squeeze level. The third optical waveguide 502C is similar to the first optical waveguide 502A, which includes a straight rail tangentially in contact with the circumference of the auxiliary ring resonator 506. The straight rail of the third optical waveguide 502C may be parallel to a virtual line 510 connecting centers of the main ring resonator 504 and the auxiliary ring resonator 506. Photon source(s) provides photons to the third optical waveguide 502C at Port C. The photons are directly injected into the auxiliary ring resonator 506. The fourth optical waveguide 502D is similar to the second optical waveguide 502B, which includes a first portion (coupling portion or arc portion) in the form of an arc that partially circles the main ring resonator 504 and a second portion (output portion or rail portion) in the form of a straight rail that has an output port Port D. The arc portion may be concentric with the circumference of the main ring resonator 504 or taper from the circumference of the main ring resonator 504. The central angle α in the main ring resonator 504 may be less than about 90°, such as in a range from about 30° to about 60°. The central angle α in the main ring resonator 504 may be larger than the central angle β in the auxiliary ring resonator 506 with respect to a larger radius (R1>R2), or vice versa. For example, the central angle α may range from about 450 to about 60°, and the central angle central angle β may range from about 30° to about 45°. By partially circling the main ring resonator 504, the near-field coupling path is extended, and efficiency of collecting squeezed photons escaping from the main ring resonator 504 is increased, which mitigates bending loss occurred in a ring resonator. The straight rail of the output portion of the fourth optical waveguide 502D may be parallel to the virtual line 510 connecting centers of the main ring resonator 504 and the auxiliary ring resonator 506.

Figure 9:
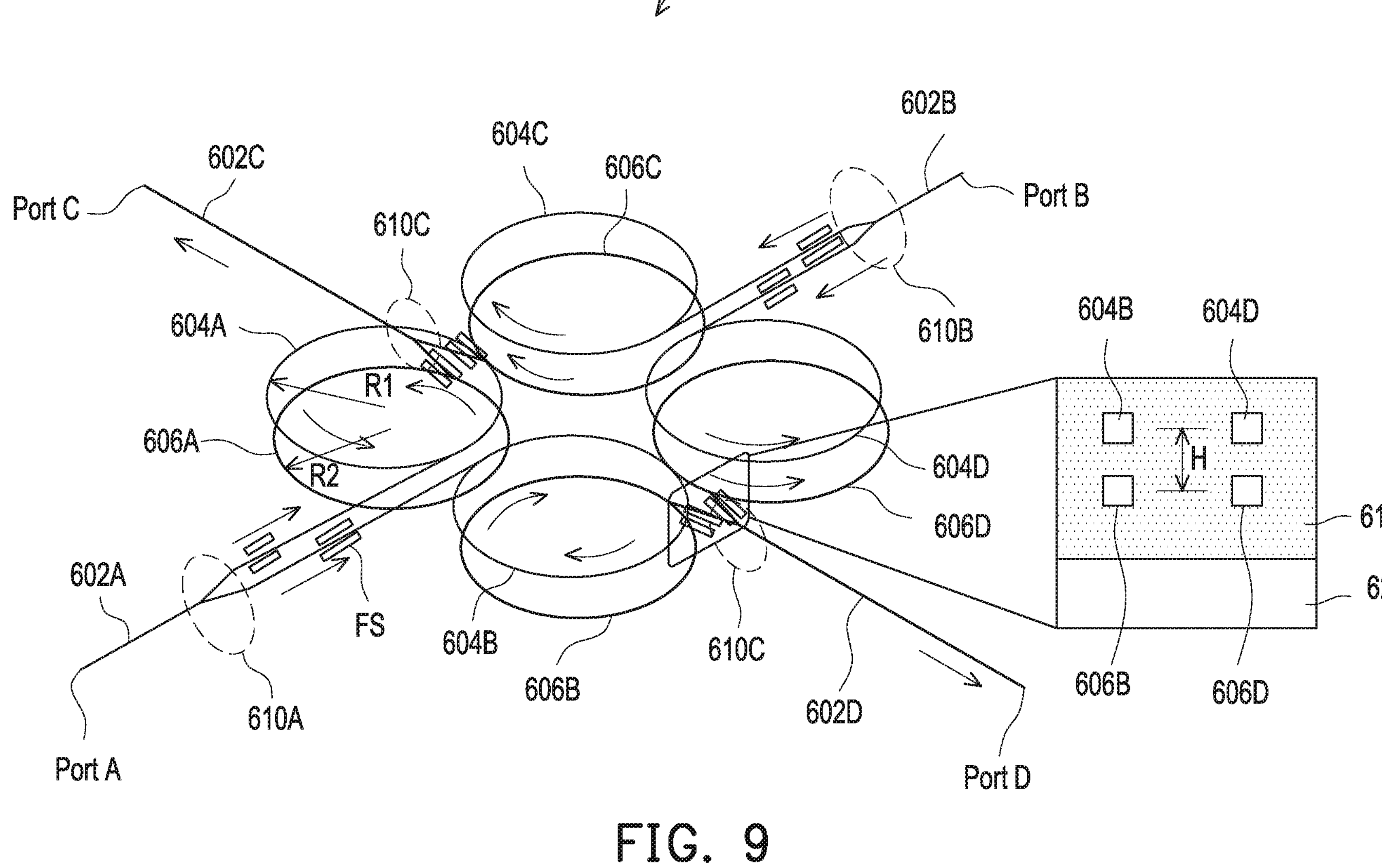
FIG. 9 illustrates a diagram of a photonic circuit with stacked ring resonators, according to an embodiment of the present disclosure.

The multiple ring resonators in a photonic circuit may be coplanar in the same plane or grouped in different planes. FIG. 9 illustrates such an exemplary embodiment. Referring to FIG. 9, a photonic circuit 600 includes a first group of ring resonators 604A, 604B, 604C, and 604D positioned in a first plane, and a second group of ring resonators 606A, 606B, 606C, and 606D in a second plane. The four ring resonators 604A-D in the first plane are arranged in a 2×2 array, and the four ring resonators 606A-D in the second plane are arranged in a 2×2 array as well. In the illustrated embodiment, the second plane having the ring resonators 606A-D is under the first plane having the ring resonators 604A-D and between the first plane and a semiconductor substrate, such that ring resonator 604A is stacked above the ring resonator 606A with centers vertically aligned, ring resonator 604B is stacked above the ring resonator 606B with centers vertically aligned, ring resonator 604C is stacked above the ring resonator 606C with centers vertically aligned, and ring resonator 604D is stacked above the ring resonator 606D with centers vertically aligned. The two stacked ring resonators form a pair. A cross-sectional view of the photonic circuit 600 cutting through portions of the ring resonators 604B, 604D, 606B, 606D is also illustrated in FIG. 9. Each of the ring resonators 604A-D and 606A-D may include a non-linear optical material (such as silicon nitride or other suitable material including $LiNbO_3$, AlGaAs, InP, or AlN) surrounded by an oxide layer 618 (such as silicon dioxide) that is disposed over a semiconductor substrate 620 (such as a silicon substrate). Further, the ring resonators and the optical waveguides may have different material compositions. In some alternative embodiments, the first plane having the ring resonators 604A-D may be under the second plane having the ring resonators 606A-D and between the second plane and the semiconductor substrate 602.

Each of the ring resonators 604A-D is identical with a radius R1. Each of the ring resonators 606A-D is identical with a radius R2. In some embodiments, each of R1 and R2 ranges from about 5 um to about 12 um. The ring resonators 604A-D and the ring resonators 606A-D may be independently trimmed or tuned to have same or different resonances and coupling characteristics. In some embodiments, R1 equals R2 (R1=R2), such that the circumferences of the two ring resonators in each pair are overlapped in a top view and the near-field coupling inside the pair is the strongest. The strong near-field coupling boosts the squeezing factor of the ring resonators. In some embodiments, R1 is larger than R2 (R1>R2). In some embodiments, R1 is smaller than R2 (R1<R2). The two rings in a pair may function as a main ring resonator and an auxiliary ring resonator similar to the discussion above with reference to FIG. 8A. In some embodiments, the vertical distance H between two ring resonators inside a pair is about 1 um to about 10 um. This range is not trivial. If H is less about 1 um, the two ring resonators may be too close and over-couple the D and P resonances; if H is larger than 10 um, the near-field coupling between the two ring resonators in a pair may become too weak. The above numeral values are exemplary, and the dimensions and intervals of the resonators can be variously formed in consideration of the wavelengths of the S, D, P resonances and the desired squeeze level.

Instead of having a single input port and a single output port, the photonic circuit 600 includes two input ports and two output ports. The extra input port and output port allow more optical power to be pumped into the photonic circuit 600 and further increase squeeze level similar to the discussion above with reference to FIG. 8B. Particularly, the photonic circuit 600 includes a first optical waveguide 602A with a first input port Port A, a second optical waveguide 602B with a second input port Port B, a third optical waveguide 602C with a first output port Port C, and a fourth optical waveguide 602D with a second output Port D. The first and second optical waveguides 602A and 602B are positioned in the first plane, and the third and fourth optical waveguides 602C and 602D are positioned in the second plane.

The first optical waveguide 602A receives source photons into a straight rail of the first optical waveguide 602A through Port A. The source (incident) photons propagate in the direction towards a splitting region 610A. The splitting region 610A may include a beam splitter, which divides the straight rail into a first branch feeding the ring resonator 604A and a second branch feeding the ring resonator 604B. The first and second branches of the first optical waveguide 602A may implement near-field point coupling (similar to the coupling mechanism in FIG. 4), near-field conformal coupling (similar to the coupling mechanism in FIG. 5), direct injection with tapering line (similar to the injection mechanism in FIG. 6A), or direction injection with tangential line (similar to the injection mechanism in FIG. 6C).

The second optical waveguide 602A receives source photons into a straight rail of the second optical waveguide 602B through Port B. The source (incident) photons propagate in the direction towards a splitting region 610B. The splitting region 610B may include a beam splitter, which divides the straight rail into a first branch feeding the ring resonator 604C and a second branch feeding the ring resonator 604D. The first and second branches of the second optical waveguide 602B may implement near-field point coupling (similar to the coupling mechanism in FIG. 4), near-field conformal coupling (similar to the coupling mechanism in FIG. 5), direct injection with tapering line (similar to the injection mechanism in FIG. 6A), or direction injection with tangential line (similar to the injection mechanism in FIG. 6C). The optical paths flowing into the first and second optical waveguides 602A and 602B are opposite to each other.

The two ring resonators in each pair provide more fractions of photons going through an SFWM process, which increases photon transition rate. Further, as discussed above, introducing over-coupling by adding an extra ring resonator mitigates intra-resonator losses that might degrade the achievable squeezing from scattering modes. Still further, extra resonance involved in unwanted four-wave mixing processes may be suppressed when the ring resonators 606A-D function as auxiliary ring resonators. The optical paths in the two ring resonators in each pair have the same directions. The propagation directions of the photons in the ring resonators may be as shown in arrows in FIG. 9.

The third optical waveguide 602C have two branches merged into a straight rail at a combining region 610C. The combining region 610C may include a beam combiner. The squeezed photons in the ring resonators 606A and 606C are coupled into the two branches of the third optical waveguide 602C and merged into the straight rail of the third optical waveguide 602 and exit from Port C, respectively, through a near-field coupling mechanism. The near-filed coupling mechanism may be near-field point coupling (similar to the coupling mechanism in FIG. 4), near-field conformal coupling (similar to the coupling mechanism in FIG. 5), or near-field circumferential coupling (similar to the coupling mechanism in FIG. 6A or FIG. 7). Thus, the third optical waveguide 602C receives photons from the first optical waveguide 602A through the ring resonator 604A and photons from the second optical waveguide 602B through the ring resonator 604C.

The fourth optical waveguide 602D have two branches merged into a straight rail at a combining region 610D. The combining region 610D may include a beam combiner. The squeezed photons in the ring resonators 606B and 606D are coupled into the two branches of the fourth optical waveguide 602D, respectively, through a near-field coupling mechanism. The near-filed coupling mechanism may be near-field point coupling (similar to the coupling mechanism in FIG. 4), near-field conformal coupling (similar to the coupling mechanism in FIG. 5), or near-field circumferential coupling (similar to the coupling mechanism in FIG. 6A or FIG. 7). Thus, the fourth optical waveguide 602D receives photons from the first optical waveguide 602A through the ring resonator 604B and photons from the second optical waveguide 602B through the ring resonator 604D.

The optical paths flowing out of the third and fourth optical waveguides 602C and 602D are opposite to each other. The optical paths flowing out of the third and fourth optical waveguides 602C and 602D are perpendicular to the optical paths flowing into the first and second optical waveguides 602A and 602B.

Optionally, the photonic circuit 600 may also include tunable and programmable phase shifters (denoted as "FS" in figures) to control phase coherency between the ring resonators and the optical waveguide(s). The phase shifters may be implemented by a method of mechanical optics (e.g., MEMS or NEMS), thermal-optics, electro-optics, or acousto-optics. In the illustrated embodiment, each of the branches of the optical waveguides 602A-D is tuned by a phase shifter.

By combining several mechanisms in boosting squeeze level into one photonic circuitry, the exemplary multiple optical resonator structure as in FIG. 9 provides a squeezed photon source with a very high squeeze level. Such multiple optical resonator structure also provides a high quality factor Q and can be implemented in optical communication systems as well.

Although not intended to be limiting, one or more embodiments of the present disclosure provide many benefits to photonic quantum technologies and/or optical communication systems. In photonic quantum technologies field, the exemplary photonic circuitries having multiple optical resonators provide squeezed light source with high optical power efficiency and high spectral purity. In optical communication system field, the exemplary photonic circuitries having multiple optical resonators provide wavelength filtering with high quality factors.

In an example aspect, the present disclosure is directed to an optical device. The optical device includes a first ring resonator with a first radius, a second ring resonator with a second radius, and an optical waveguide feeding the first and second ring resonators in parallel. The first and second ring resonators are positioned on opposing sides of the optical waveguide, and the first and second ring resonators and the optical waveguide are disposed above a semiconductor substrate. In some embodiments, the first and second ring resonators include an optical medium providing a third-order nonlinear optical susceptibility. In some embodiments, the optical waveguide is a straight rail extending through a virtual line connecting centers of the first and second ring resonators. In some embodiments, the optical waveguide is split into a first portion partially surrounding the first ring resonator and a second portion partially surrounding the second ring resonator. In some embodiments, the first portion partially surrounds the first ring resonator for half a circle, and the second portion partially surrounds the second ring resonator for half a circle. In some embodiments, a distance between the first portion and a circumference of the first ring resonator remains constant, and a distance between the second portion and a circumference of the second ring resonator remains constant. In some embodiments, the optical device further includes a third ring resonator with a third radius and stacked directly under the first ring resonator, and a fourth ring resonator with a fourth radius and stacked directly under the second ring resonator. In some embodiments, the first radius equals the second radius, and the third radius equals the fourth radius. In some embodiments, the optical waveguide is split into a first branch feeding the first ring resonator and a second branch feeding the second ring resonator. In some embodiments, the optical device further includes a second optical waveguide coupled with the third ring resonator, and a third optical waveguide coupled with the fourth ring resonator.

In another example aspect, the present disclosure is directed to an optical device. The optical device includes a first ring resonator with a first radius, a second ring resonator with a second radius, a first optical waveguide directly injecting photons into the first ring resonator, and a second optical waveguide accepting photons escaping from the second ring resonator. The first and second ring resonators are positioned between the first and second optical waveguides, and the first and second ring resonators and the first and second optical waveguides are disposed above a semiconductor substrate. In some embodiments, the second optical waveguide is coupled to the second ring resonator through near-field coupling. In some embodiments, the near-field coupling is near-field conformal coupling. In some embodiments, the near-field coupling is near-field circumferential coupling. In some embodiments, the first radius is larger than the second radius. In some embodiments, the second optical waveguide includes a straight rail, and an extension of the straight rail travels through the first and second ring resonators. In some embodiments, the first optical waveguide includes a tapering portion that is in direct contact with a circumference of the first ring resonator.

In yet another example aspect, the present disclosure is directed to a method. The method includes sending a source light beam into a first optical waveguide, direct injecting the source light beam into a first ring resonator through an end portion of the first optical waveguide that is in physical contact with the first ring resonator, a fraction of the source light beam is converted into a signal light beam via a spontaneous four-wave mixing process, coupling photons in at least the signal light beam into a second ring resonator through near-field coupling between the first ring resonator and the second ring resonator, and coupling the photons into a second optical waveguide through near-field coupling between the second ring resonator and the second optical waveguide. In some embodiments, a portion of the second optical waveguide partially surrounds the second ring resonator. In some embodiments, the second ring resonator suppresses auxiliary resonance within the first ring resonator.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical device, comprising:

a first ring resonator with a first radius;

a second ring resonator with a second radius;

a third ring resonator with a third radius and stacked directly under the first ring resonator;

a fourth ring resonator with a fourth radius and stacked directly under the second ring resonator; and an optical waveguide feeding the first and second ring resonators in parallel, wherein the first and second ring resonators are positioned on opposing sides of the optical waveguide, wherein the optical waveguide includes a straight rail, wherein when viewed from top a virtual line connecting centers of the first and second ring resonators is perpendicular to a lengthwise direction of the straight rail, and wherein the first and second ring resonators and the optical waveguide are embedded in a dielectric layer disposed above a semiconductor substrate.

2. The optical device of claim 1, wherein the first and second ring resonators include an optical medium providing a third-order nonlinear optical susceptibility.

3. The optical device of claim 1, wherein the optical waveguide is split into a first portion partially surrounding the first ring resonator and a second portion partially surrounding the second ring resonator.

4. The optical device of claim 3, wherein the first portion partially surrounds the first ring resonator for half a circle, and the second portion partially surrounds the second ring resonator for half a circle.

5. The optical device of claim 3, wherein a distance between the first portion and a circumference of the first ring resonator remains constant, and a distance between the second portion and a circumference of the second ring resonator remains constant.

6. The optical device of claim 1, wherein the first radius equals the second radius, and the third radius equals the fourth radius.

7. The optical device of claim 1, wherein the optical waveguide is split into a first branch feeding the first ring resonator and a second branch feeding the second ring resonator.

8. The optical device of claim 1, further comprising:

a second optical waveguide coupled with the third ring resonator; and a third optical waveguide coupled with the fourth ring resonator.

9. The optical device of claim 1, wherein the optical waveguide is a first optical waveguide, the optical device further comprising:

a second optical waveguide configured to receive photons escaping from the first ring resonator, wherein a distance between the first optical waveguide and a top surface of the semiconductor substrate is different from a distance between the second optical waveguide and the top surface of the semiconductor substrate.

10. The optical device of claim 1, wherein the first radius equals the third radius, and the second radius equals the fourth radius.

11. An optical device, comprising:

a first ring resonator with a first radius;

a second ring resonator with a second radius;

a first optical waveguide directly injecting photons into the first ring resonator; and a second optical waveguide accepting photons escaping from the second ring resonator, wherein the first and second ring resonators are positioned between the first and second optical waveguides, wherein the first and second ring resonators and the first and second optical waveguides are all disposed above a top surface of a semiconductor substrate, and wherein a distance between the first ring resonator and the top surface of the semiconductor substrate is different from a distance between the second ring resonator and the top surface of the semiconductor substrate.

12. The optical device of claim 11, wherein the second optical waveguide is coupled to the second ring resonator through near-field coupling.

13. The optical device of claim 12, wherein the near-field coupling is near-field conformal coupling.

14. The optical device of claim 12, wherein the near-field coupling is near-field circumferential coupling.

15. The optical device of claim 11, wherein the first radius is larger than the second radius.

16. The optical device of claim 11, wherein the first optical waveguide includes a tapering portion that is in direct contact with a circumference of the first ring resonator.

17. A method, comprising:

sending a source light beam into a first optical waveguide, wherein the first optical waveguide has a first straight rail extending lengthwise along a first direction;

direct injecting the source light beam into a first ring resonator through an end portion of the first optical waveguide that is in physical contact with the first ring resonator, wherein a fraction of the source light beam is converted into a signal light beam via a spontaneous four-wave mixing process;

coupling photons in at least the signal light beam into a second ring resonator through near-field coupling between the first ring resonator and the second ring resonator; and coupling the photons into a second optical waveguide through near-field coupling between the second ring resonator and the second optical waveguide, wherein the second optical waveguide has a second straight rail extending lengthwise along a second direction that is different from the first direction, wherein the first and second ring resonators and the first and second optical waveguides are all embedded in a dielectric layer disposed above a top surface of a semiconductor substrate.

18. The method of claim 17, wherein a portion of the second optical waveguide partially surrounds the second ring resonator.

19. The method of claim 17, wherein the second ring resonator suppresses auxiliary resonance within the first ring resonator.

20. The optical device of claim 11, wherein the first radius equals the second radius.

* * * * *